United States Patent [19]
Asakura et al.

[11] Patent Number: 5,430,513
[45] Date of Patent: Jul. 4, 1995

[54] AUTOMATIC FILM FEEDING APPARATUS FOR CAMERA

[75] Inventors: Yasuo Asakura; Shunji Matsutani; Minoru Hara; Shinya Takahashi; Masaki Nagao, all of Tokyo; Masaki Tokui, Kanagawa; Youji Watanabe; Masahiro Dai, both of Tokyo, all of Japan

[73] Assignee: Olympus Optical Co., Ltd., Tokyo, Japan

[21] Appl. No.: 237,229

[22] Filed: May 2, 1994

Related U.S. Application Data

[63] Continuation of Ser. No. 14,423, Feb. 5, 1993, abandoned.

[30] Foreign Application Priority Data

Feb. 13, 1992 [JP] Japan .................................. 4-059354
Feb. 13, 1992 [JP] Japan .................................. 4-059355

[51] Int. Cl.⁶ .......................... G03B 1/18; G03B 17/36
[52] U.S. Cl. ................................. 354/173.1; 354/217
[58] Field of Search ............... 354/173.1, 173.11, 212, 354/217, 218, 215

[56] References Cited

U.S. PATENT DOCUMENTS

| | | | |
|---|---|---|---|
| Re. 33,436 | 11/1990 | Araki et al. | 354/173.1 |
| 4,690,533 | 9/1987 | Wakabayashi et al. | 354/173.11 |
| 4,878,075 | 10/1989 | Cannon | 354/173.1 |
| 4,918,474 | 4/1990 | Kawamura et al. | 354/173.1 |
| 4,947,196 | 8/1990 | Wash et al. | 354/173.11 |
| 4,982,212 | 1/1991 | Alyfuku | 354/173.1 |
| 5,130,728 | 7/1992 | Goto et al. | 354/105 |
| 5,142,313 | 8/1992 | Haraguchi et al. | 354/173.1 |
| 5,160,953 | 11/1992 | Iwashita et al. | 354/173.11 |
| 5,172,148 | 12/1992 | Ezawa | 354/173.1 |
| 5,221,939 | 6/1993 | Taniguchi et al. | 354/173.1 |
| 5,247,321 | 9/1993 | Kazami | 354/106 |
| 5,255,034 | 10/1993 | Shimada et al. | 354/173.1 |

FOREIGN PATENT DOCUMENTS 2-67534 3/1990 Japan .
2-151844 6/1990 Japan .
4-31840 2/1992 Japan .

*Primary Examiner*—M. L. Gellner
*Assistant Examiner*—Nicholas J. Tuccillo
*Attorney, Agent, or Firm*—Frishauf, Holtz, Goodman & Woodward

[57] ABSTRACT

A film cartridge in which a supply spool incorporated in a cartridge body is rotated to supply a film wound on the supply spool out of the cartridge body. A film supply unit rotates the supply spool to supply the film out of the film cartridge. A first control unit controls the film supply unit such that a supply operation of the film is started in response to a closing operation of the rear cover of a camera body. A film take-up unit takes up the film supplied by the film supply unit. A second control unit controls the film take-up unit to operate the film take-up unit upon completion of the supply operation of the film performed by the film supply unit. A third control unit interrupts a take-up operation of the film performed by the film take-up unit and reoperates the film supply unit when the take-up operation of the film is impossible during the take-up operation of the film performed by the film take-up unit.

2 Claims, 22 Drawing Sheets

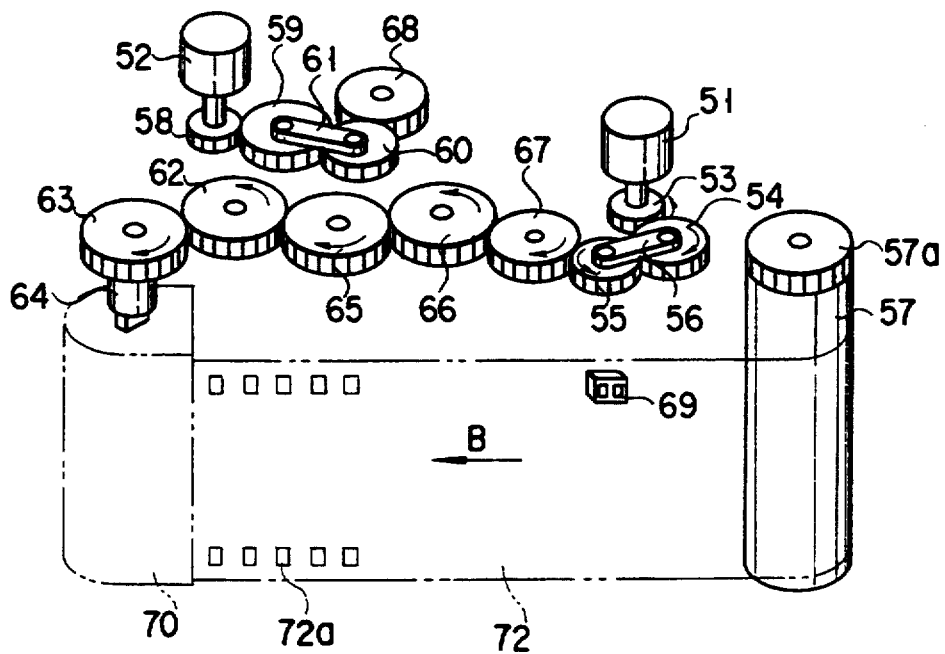
F I G. 3
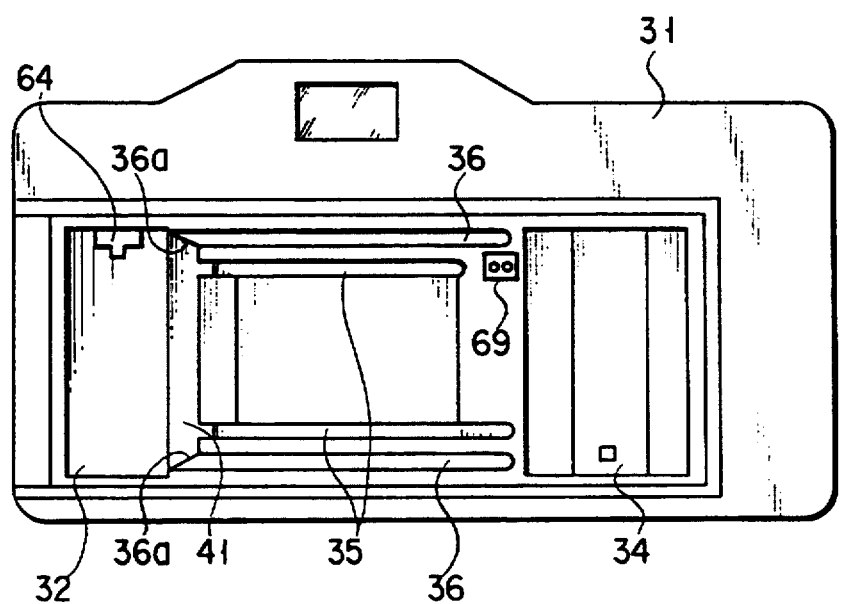
F I G. 4

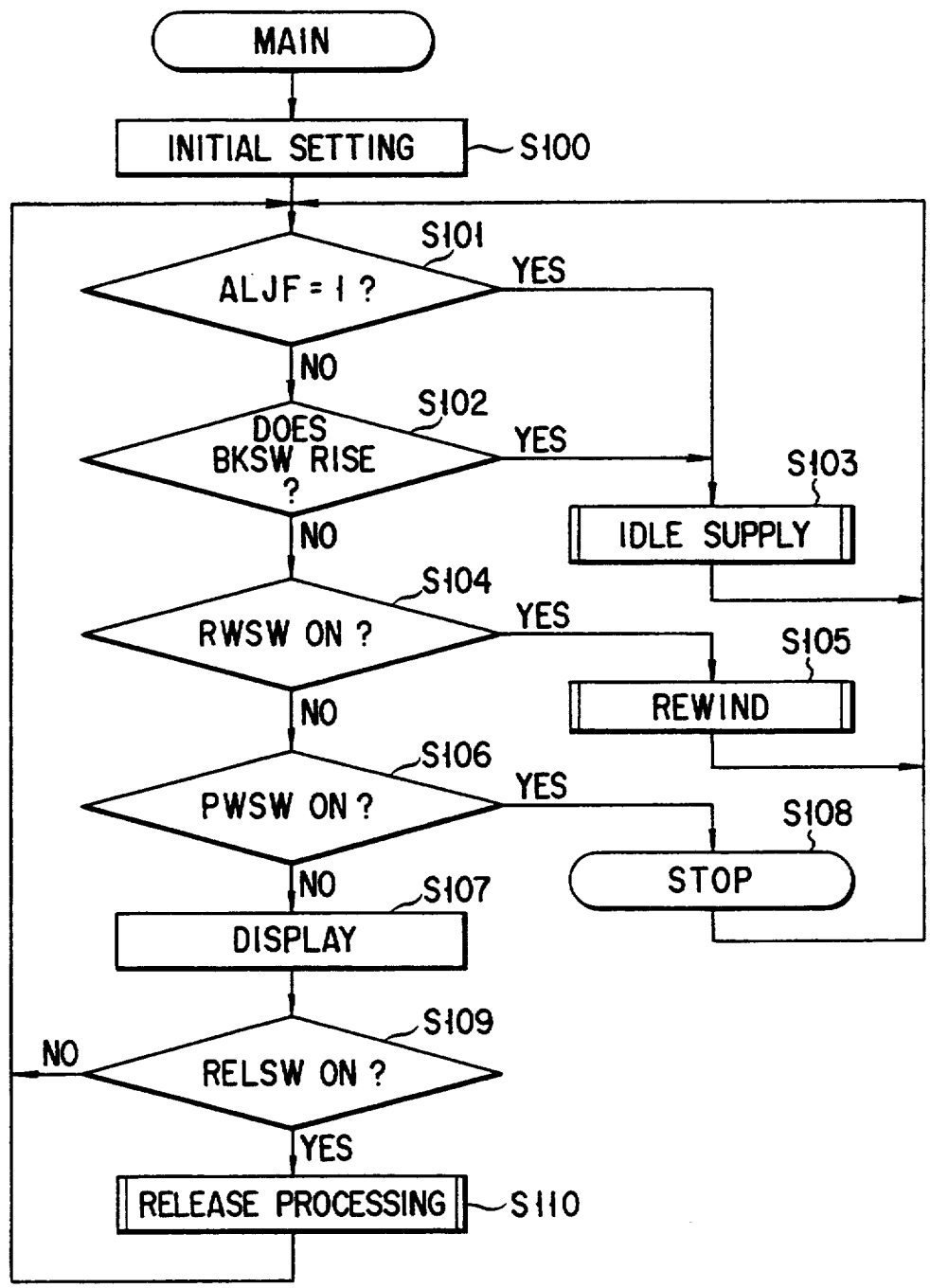
F I G. 8

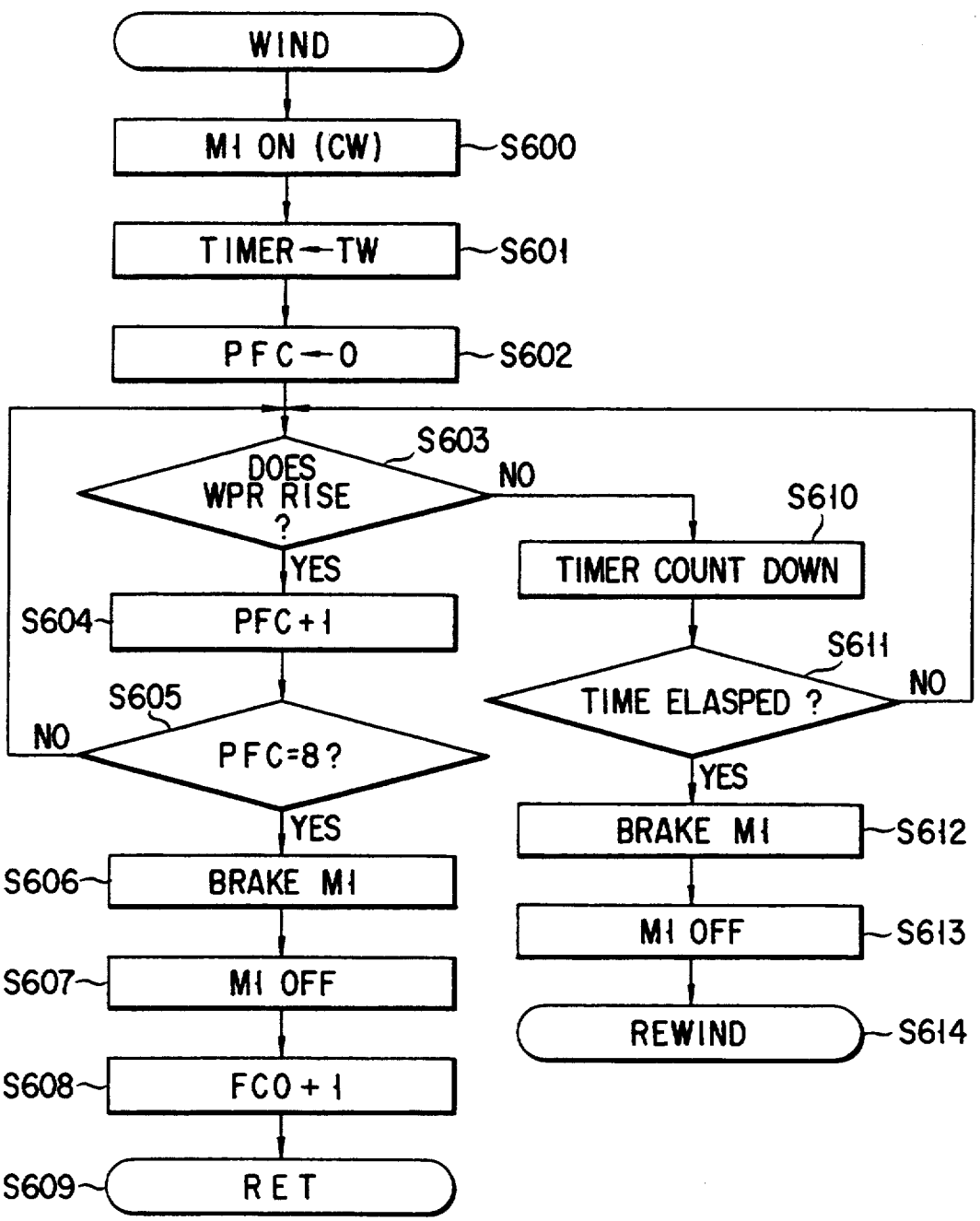
F I G. 13

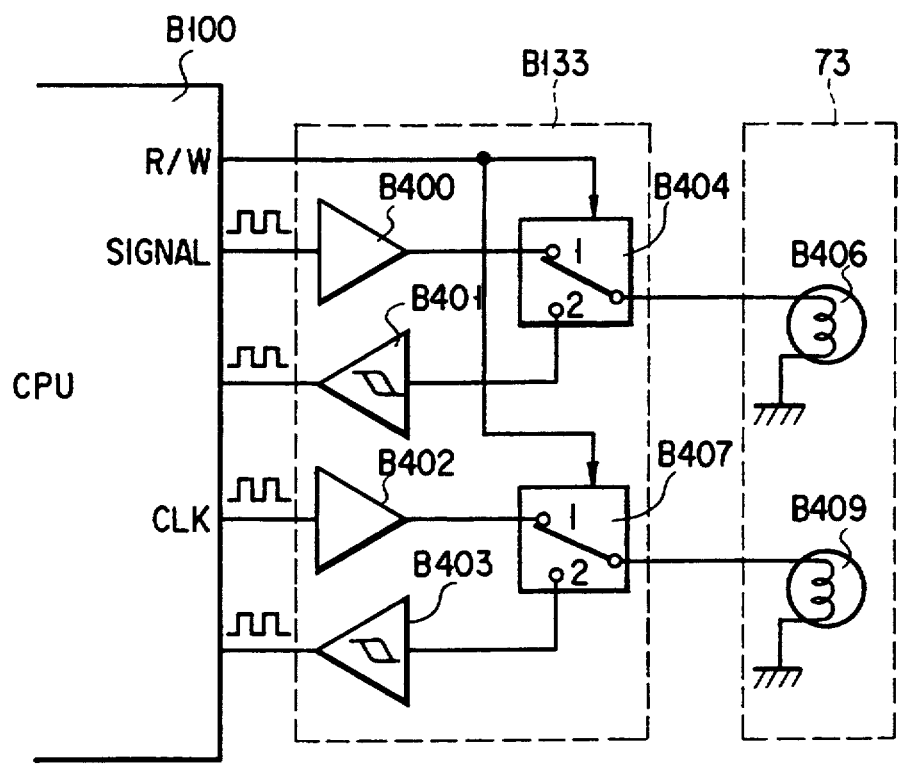
F I G. 16
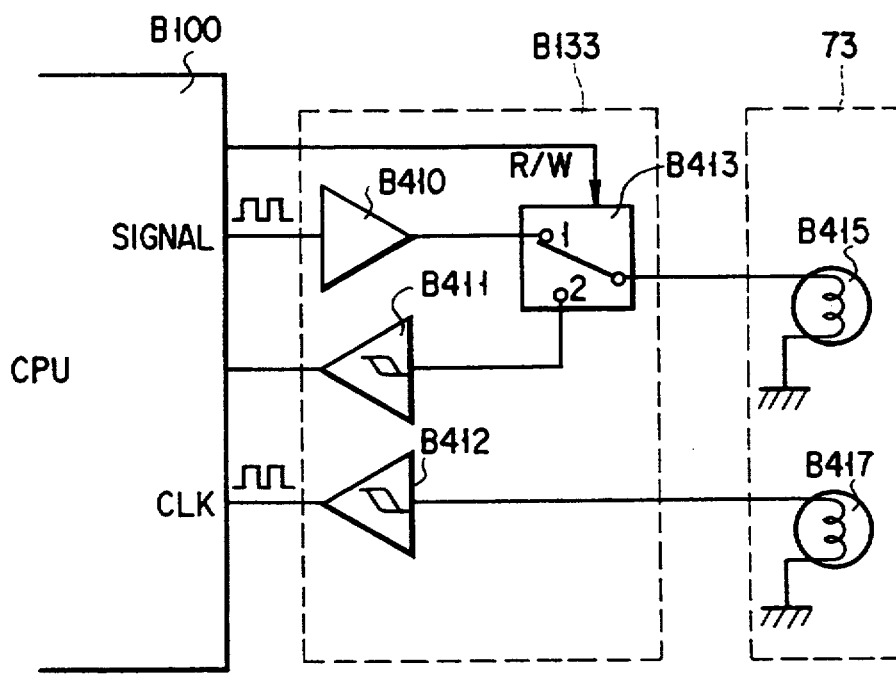
F I G. 17

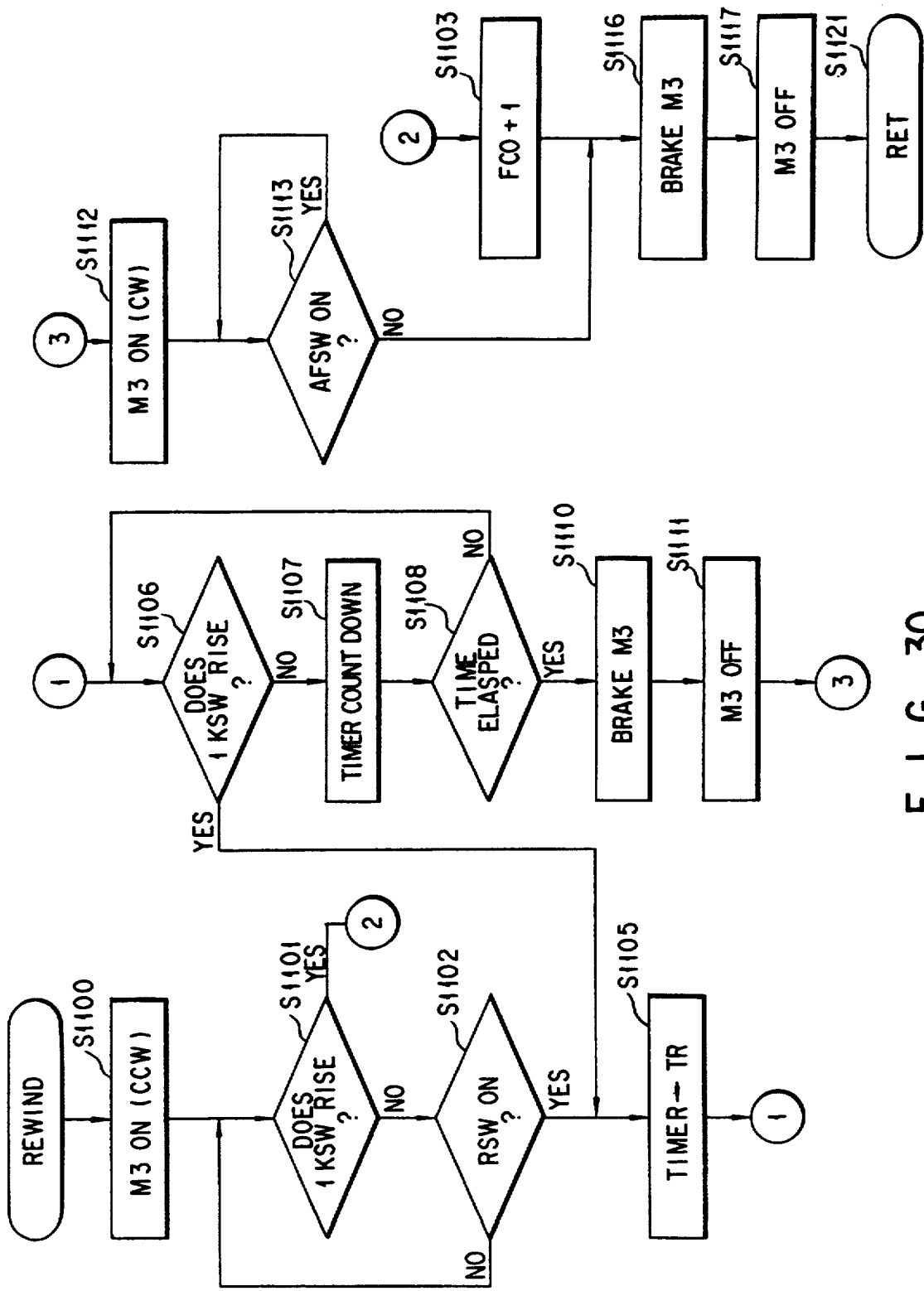
F I G. 30

AUTOMATIC FILM FEEDING APPARATUS FOR CAMERA

This application is a continuation of application Ser. No. 08/014,423, filed Feb. 5, 1993, now abandoned.

BACKGROUND OF THE INVENTION

1. Field of the Invention

The present invention relates to an automatic film feeding apparatus for a camera and, more particularly, to an automatic film feeding apparatus for a camera using a film cartridge in which a nonexposed film is automatically supplied from the film cartridge by rotation of a supply spool in the film cartridge in one direction, and an exposed film is automatically rewound by rotation of the supply spool in the other direction.

The present invention also relates to an automatic film feeding apparatus for a camera in which photographic preparation is performed by automatically feeding a film from a film cartridge loaded in a camera body.

2. Description of the Related Art

In a conventional film cartridge, a film is automatically rewound by rotating a cartridge shaft in a rewinding direction, and the film is supplied as follows. That is, the film is loaded in the camera such that one end of the film is manually fed to be close to a take-up spool, and the film is taken up by the take-up spool. In this state, the film is wound on the spool. Therefore, when the film cartridge is only loaded in the camera, the film cannot be automatically supplied, and a cumbersome operation must be performed.

In recent years, in order to decrease the number of manual operations of a photographer and to prevent erroneous operations, countermeasures have been proposed in which a film is wound on a spool by a driving source such as a motor after a film is loaded in a camera body, thereby performing photographic preparation.

For example, a film cartridge of a new type in which a film is automatically supplied by the rotation of a supply spool of the film cartridge in one direction has been proposed (Published Unexamined Japanese Patent Application No. 2-67534). Since the newly proposed film cartridge can automatically supply/rewind the film by the same driving member, a photographer is required only to load the newly proposed film cartridge in the camera, and he or she need not pull one end of the film. A cumbersome operation in film loading operation can be considerably reduced.

However, in the newly proposed film cartridge, when a user erroneously opens the rear cover of the camera during a film supply operation, the film is supplied out of the rear cover, and a nonexposed film portion is unnecessarily exposed. That is, since a conventional film cartridge itself does not have a film supply function, even when the rear cover is opened, the film is not further supplied from the cartridge. However, since the newly proposed film cartridge itself has a film supply function, the nonexposed film may be unconditionally supplied.

In addition, a film feeding apparatus capable of easily being operated and having a conventionally used film cartridge is described in Published Unexamined Japanese Patent Application No. 2-151844.

In each of the techniques described in the Published Unexamined Japanese Patent Application Nos. 2-67534 and 2-151844, a film stored in the film cartridge is automatically supplied to reach a film take-up spool mounted in the camera body, and the film is taken up by the film take-up spool.

In order to automatically wind a film on the take-up spool, two conventional techniques are used. That is, first, as one technique, a film is wound on the take-up spool using a frictional force between the film and the take-up spool. Second, as the other technique, lock pawls formed on an outer peripheral surface of the take-up spool are engaged with perforations formed in the film.

A normal photographic film has an elastic coefficient changed in accordance with the application conditions such as an atmospheric temperature, of a camera. Therefore, when the film is wound on the take-up spool using the frictional force between the film and the take-up spool, if the elastic coefficient of the film is large due to a low atmospheric temperature, the film is not properly curved along the take-up spool, and the film cannot be easily wound on the take-up spool. In addition, when the method of winding the film by engaging the lock pawls of the take-up spool with the perforations of the film is used, since shearing strength of the film is decreased in accordance with a decrease in temperature of the film, the perforations and other parts of the film cannot withstand the engaging force of the lock pawls and are damaged, and the film cannot be wound on the take-up spool.

In a normal state, when a winding operation of a film is impossible, the position of a film leader is slightly changed when the film is loaded so as to change the condition in which the winding operation is impossible. At this time, the film can be often wound. Therefore, in a conventional automatic film loading apparatus, when a film cannot be wound, a photographer changes the position of the film leader and loads the film in the camera again.

However, when the film is to be reloaded in the camera body, a photographer determines whether the position of the film leader is changed or not. Beginners rarely execute this determination, and repeat operations such as reloading and impossible winding many times or give up loading the film in the camera body.

SUMMARY OF THE INVENTION

It is, therefore, an object of the present invention to provide a new and improved automatic film feeding apparatus for a camera in which, even if the rear cover of the camera is erroneously opened during a film supply operation, a film can be automatically and reliably loaded in the camera by closing the rear cover to minimize exposure of the film.

It is another object of the present invention to provide an automatic film feeding apparatus, capable of solving the above various problems, in which even if a winding operation of a film is impossible due to a change in application conditions of a camera, the position of a film leader is automatically changed, and the film is wound again, so that the film can be reliably wound on a take-up spool.

According to one aspect of the present invention, there is provided a camera using a film cartridge in which a supply spool incorporated in a cartridge body is rotated to supply a film wound on the supply spool out of a film cartridge body, comprising: film supply means for rotating the supply spool to supply the film out of the film cartridge; first control means for controlling the film supply means, the first control means starting a supply operation of the film by the film supply means in response to a closing operation of a rear cover of a camera body; film take-up means for taking up the film supplied by the film supply means; second control means for controlling the film take-up means, the second control means operating the film take-up means upon completion of the film supply operation performed by the film supply means; and third control means for interrupting a film take-up operation performed by the film take-up means and operating the film supply means again when the film take-up operation is impossible during the take-up operation of the film taken up by the film take-up means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 3 is a perspective view showing the feeding apparatus for the camera when viewed from the back in the state wherein a film is rewound in the film cartridge in FIG. 1;

FIG. 4 is a rear view of the camera whose rear cover is removed according to the first embodiment of the present invention;

FIG. 8 is a flow chart of a main routine according to the first embodiment of the present invention;

FIG. 13 is a flow chart of a winding subroutine according to the first embodiment of the present invention;

FIG. 16 is a detailed circuit diagram showing a magnetic information controller shown in FIG. 15;

FIG. 17 is a detailed circuit diagram showing a modification of the magnetic information controller shown in FIG. 15;

FIG. 30 is a flow chart of a winding subroutine according to the third embodiment of the present invention.

DETAILED DESCRIPTION OF THE PREFERRED EMBODIMENTS

Figure 1:
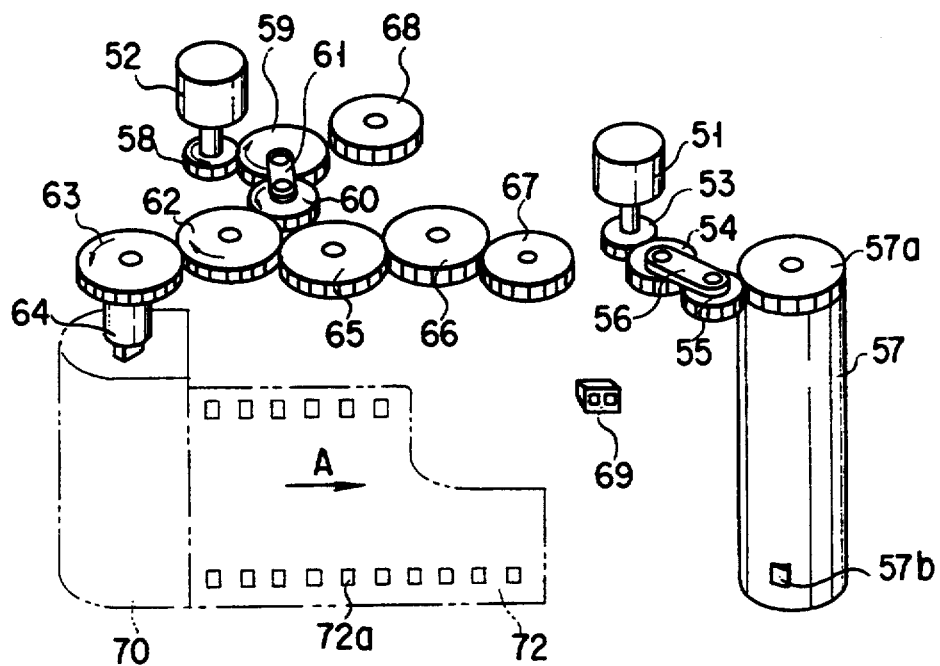
FIG. 1 is a perspective view showing a feeding apparatus for a camera according to the first embodiment of the present invention when viewed from the back immediately after a film cartridge is loaded in a camera body.

Reference will now be ade in detail to the presently preferred embodiments of the invention as illustrated in the accompanying drawings, in which like reference characters designate like or corresponding parts throughout the several drawings.

Figure 2:
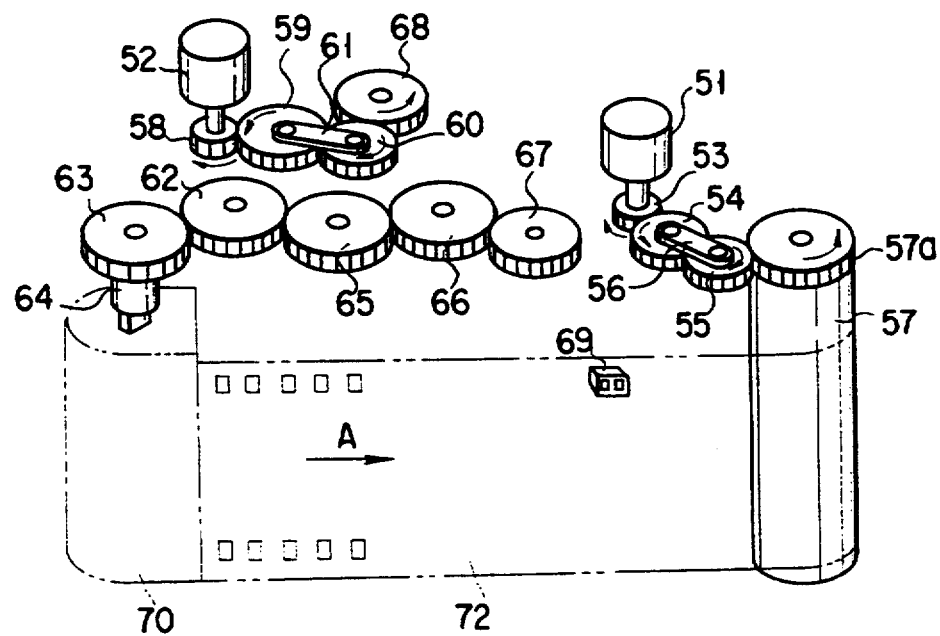
FIG. 2 is a perspective view showing the feeding apparatus for the camera when viewed from the back in a state wherein the film is wound on a take-up spool in FIG. 1.
Figure 5:
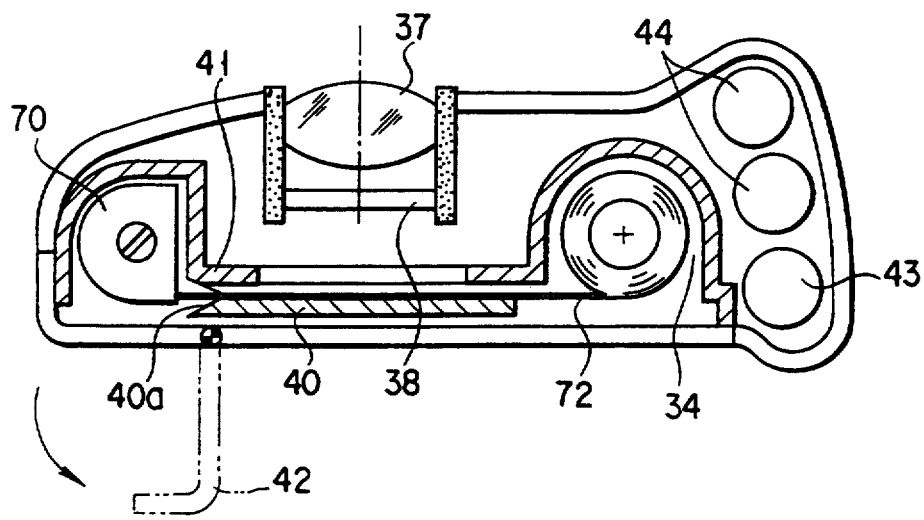
FIG. 5 is a sectional view showing the camera in FIG. 4.
Figure 6:
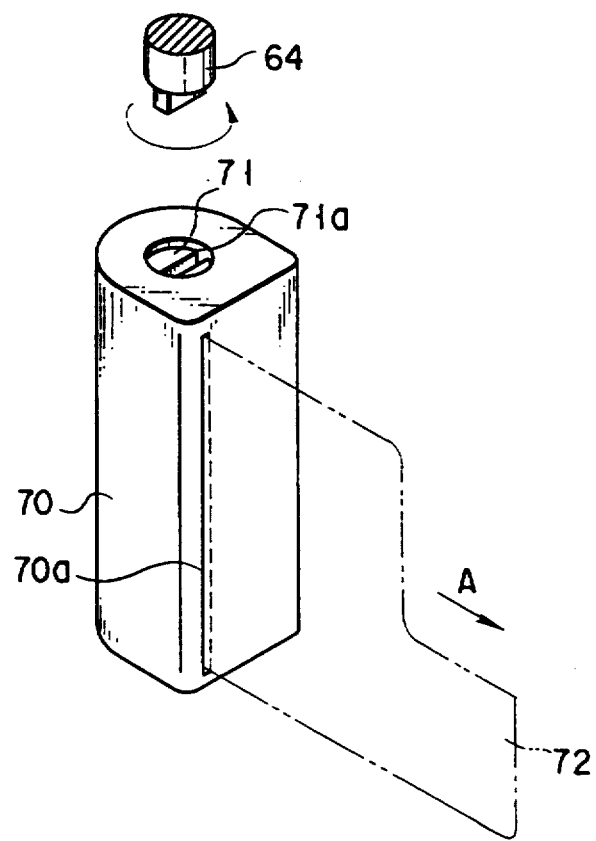
FIG. 6 is a perspective view showing a film cartridge in detail used in the first embodiment of the present invention.

The present invention will be described below in detail using embodiments illustrated in the accompanying drawings. FIGS. 1 to 3 are perspective views showing a film feeding apparatus for a camera according to the first embodiment of the present invention when viewed from the back. FIG. 1 shows a state immediately after a film cartridge is loaded in a camera body, FIG. 2 shows a state wherein the film is wound on a take-up spool, and FIG. 3 shows a state wherein the film is rewound into the film cartridge. FIG. 4 is a rear view showing the camera whose rear cover is removed according to the first embodiment, FIG. 5 is a horizontal sectional view showing the camera according to the first embodiment. In addition, FIG. 6 is a perspective view showing a film cartridge used in the camera according to the first embodiment.

A pinion gear 53 is arranged on the output shaft of a film winding/rewinding motor 51 mounted in a camera body 31 shown in FIG. 4. The pinion gear 53 is meshed with a sun gear 54. The sun gear 54 is meshed with a planetary gear 55, and the planetary gear 55 is supported through a gear arm 56 to revolve around the rotating shaft of the sun gear 54. A take-up spool 57 for winding a film is rotatably mounted in a film winding chamber 34 arranged in the camera body 31 on the right side of the camera main body when viewed from the back. A spool gear 57a meshed with the planetary gear 55 when the planetary gear 55 revolves counterclockwise is integrally arranged on the upper end face of the take-up spool 57. In addition, perforation lock pawls 57b engaged with perforations 72a of a film 72 (to be described later) project from the lower outer peripheral surface of the take-up spool 57.

An idle gear 67 is arranged at a position meshed with the planetary gear 55 when the planetary gear 55 revolves clockwise. The planetary gear 55 is coupled to a coupler gear 63 (to be described later) through the idle gear 67, and idle gears 66, 65, and 62.

A film supply motor 52 is arranged in the camera body 31. A pinion gear 58 is arranged on the output shaft of the film supply motor 52. The pinion gear 58 is meshed with a sun gear 59. The sun gear 59 is meshed with a planetary gear 60, and the planetary gear 60 is supported through a gear arm 61 to revolve around the rotating shaft of the sun gear 59.

On the right side of the camera body 31 when viewed from the back, a cartridge storing chamber 32 for storing a film cartridge 70 illustrated by an alternate long and two short dashed line in FIG. 1 is arranged. The coupler gear 63 having a coupler 64 whose distal end projects in the form of a "-" shape as shown in FIG. 4 is rotatably formed on the upper side of the cartridge storing chamber 32. The coupler 64, as shown in the perspective view in FIG. 6, is fitted in a groove 71a formed in the upper end face of a spool 71 arranged in the film cartridge 70, and is rotated integrally with the spool 71. The coupler gear 63 is always meshed with the idle gear 62 as described above. In addition, a photoreflector (to be referred to as a WPR hereinafter) 69, fixed on the camera body, for outputting a pulse signal every time the perforation 72a of the film 72 passes by the photoreflector is arranged at a position near the center of the camera on the take-up spool 57 side at a level opposite to the upper perforations 72a of the film 72.

The cartridge storing chamber 32 and the film winding chamber 34, as shown in FIG. 5, are integrally formed by the same material and arranged on the rear portion in the camera body 31. As shown in FIG. 5, a shutter mechanism 38 and a photographic lens 37 are arranged in the front portion of the camera body 31. In addition, batteries 44 and a capacitor 43 for an electronic flash are incorporated on the right side of the film winding chamber 34.

A rear cover 42 is arranged on the rear side of the film cartridge storing chamber 32 to be openable with respect to the camera body 31, and a film pressure plate 40 for pressing the film 72 forward is arranged on the right side of the rear cover 42. As shown in FIG. 4, a film rail surface 35 and a film pressure plate rail surface 36 are arranged opposite to the film pressure plate 40. The film 72 is pressed by the rails and the plate to keep the flatness. In addition, inclined guide surfaces 40a (FIG. 5), 41, and 36a (FIG. 4) are formed on the film pressure plate 40, the film cartridge storing chamber 32, and the film pressure plate rail surface 36, respectively, and the inclined guide surfaces 40a, 40, and 36a guide the film 72 in the direction of the height, the front and the rear of the film 72 when the film 72 is supplied by the spool 71 arranged in the film cartridge 70.

Figure 7:
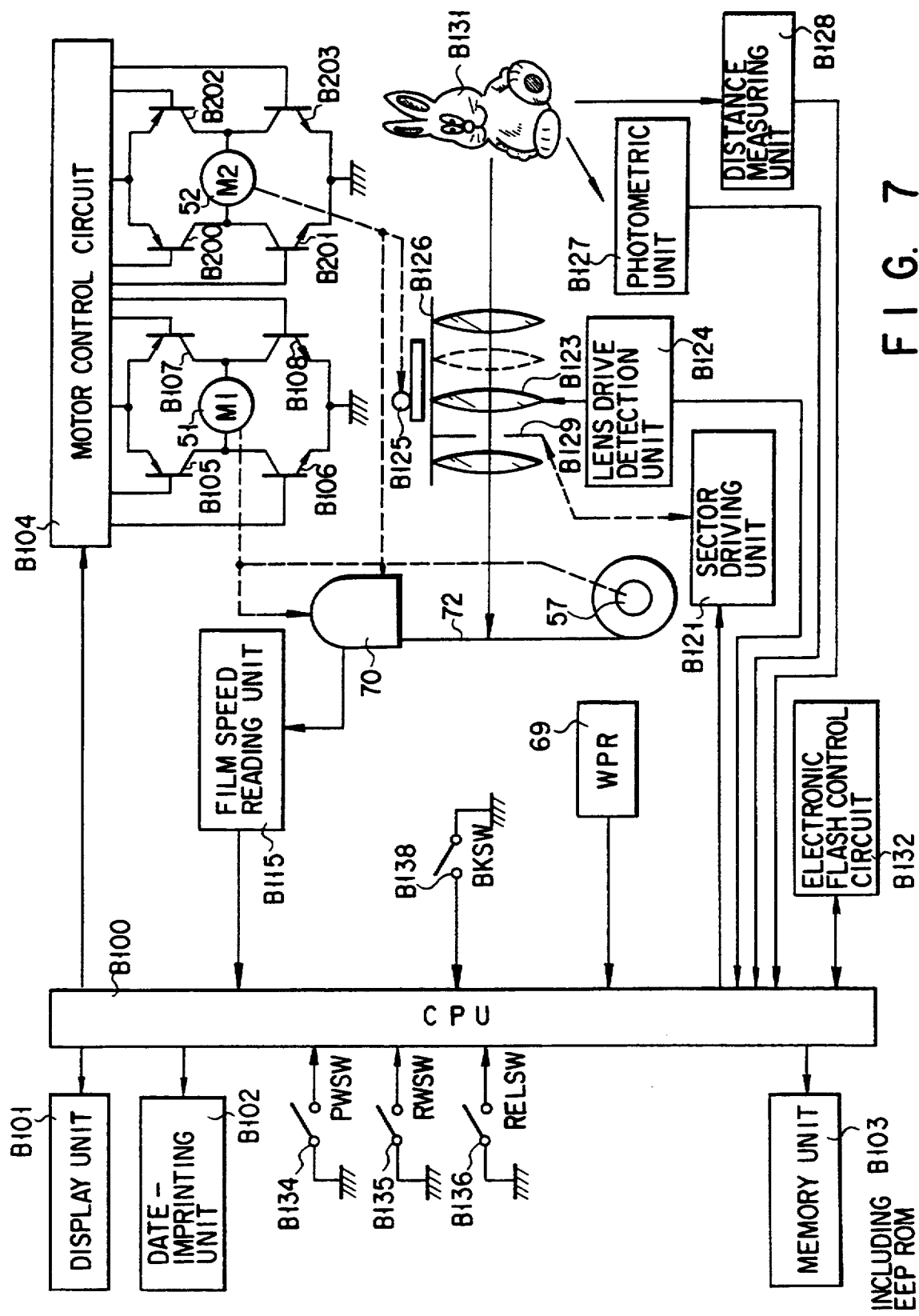
FIG. 7 is a block diagram showing an electrical circuit according to the first embodiment of the present invention.

An electrical circuit according to the first embodiment will be described below with reference to FIG. 7. A display unit B101 for displaying the number of frames or the like using a liquid crystal display element (LCD), a date-imprinting unit B102 for imprinting the date on a film, and a memory unit B103 for storing the number of photographed frames, various adjustment values, a state flag, a perforation count value, and the like using an electrically erasable EEPROM or the like are connected to a 1-chip microcomputer (to be referred to as a CPU hereinafter) B100 for controlling the whole camera applied to the present invention. In addition, a motor control circuit B104 is connected to the CPU B100, and the motor control circuit B104 decodes a signal supplied from the CPU B100 to set a motor voltage for driving motors M1 and M2 (51, 52), to select the motors, and to select operations (a rotating operation, a reversely rotating operation, a braking operation, and a turn-off operation) of the motor.

Transistors B105 to B108 and B200 to B203 are connected between the motor control circuit B104 and motors M1 51 and M2 52, and these transistors constitute a motor bridge circuit. The motor M1 51 is rotated clockwise by turning on the transistors B105 and B108, is rotated counterclockwise by turning on the transistors B106 and B107, and is braked by turning on the transistors B106 and B108. The motor M2 52 is rotated clockwise by turning on the transistors B200 and B203, is rotated counterclockwise by turning on the transistors B201 and B202, and is braked by turning on the transistors B201 and B203.

In addition, a film speed reading unit B115 and a sector driving unit B121 are connected to the CPU B100, the film speed reading unit B115 reads film speed information and an initial frame count stored in the film cartridge to transmit the data to the CPU B100. The sector driving unit B121 receives a signal from the CPU B100 to open and close sectors B129, and transmits the open/closed states of the sectors B129 to the CPU.

Reference symbol B126 denotes a lens barrel for a photographic lens group. A focusing lens B123, a lens drive detection unit B124 for converting the motion of the focusing (AF) lens B123 into a pulse signal to transmit it to the CPU B100, and a gear B125 for transmitting a driving amount of the motor M2 52 to drive the focusing (AF) lens B123 are arranged in the lens barrel. In addition, the sectors B129 driven by the sector driving unit B121 to control an exposure amount are arranged in the lens barrel B126.

A distance measuring unit B128 for measuring the distance between the camera and an object B131 to be photographed and a photometric unit B127 for measuring object brightness are connected to the CPU B100. The CPU B100 is also connected to an electronic flash controller B132.

A power switch (PWSW) B134 of the camera which is set in a photographic state when the power switch B134 is turned on, a rewinding switch (RWSW) for rewinding a film halfway, a release switch (RELSW) B136 for performing an exposure operation, and a rear cover detection switch (BKSW) B138, turned on in an open state of the rear cover, for detecting the open/closed state of the rear cover are connected to the CPU B100. In addition, the photoreflector (WPR) 69 for detecting the perforations of a film is also connected to the CPU B100.

An operation of the first embodiment of the present invention arranged as described above will be described using the flow charts of FIGS. 8 to 13. When the batteries 44 are loaded as a power supply in the camera body 31 to turn on the power switch B134, the CPU B100 executes the main routine (FIG. 8). In step S100, system resetting such as setting of the ports of the CPU B100 and read access to the EEPROM in the memory unit B103 is performed.

In step S101, the CPU B100 checks an idle supply state flag ALJF. If the flag is set to be "1" in step S101, the flow advances to step S103, and an idle supply operation is performed. If the flag is set to be "0" in step S101, the flow advances to step S102, the CPU B100 checks by a rise signal from the rear cover switch BKSW B138 whether the open state of the rear cover is changed into the closed state. In this case, when the rise signal from the rear cover switch (BKSW) B138 is detected, since the open state of the rear cover is changed into the closed state, the flow advances to an idle supply subroutine in step S103. Note that the idle supply subroutine will be described in detail in FIGS. 9 and 10.

When the rise signal from the rear cover switch (BKSW) B138 is not detected, the CPU B100 checks in step S104 whether the rewinding switch RWSW B135 is ON. If YES in step S104, the flows advances to step S105 of a rewinding subroutine (this rewinding subroutine will be described in FIG. 11). If NO in step S104, the CPU B100 checks whether the power switch (PWSW) B134 is ON (step S106). When the PWSW B134 is set in an OFF state, all the operations of the camera are stopped to set the camera in a stop state. On the other hand, when the PWSW B134 is ON, the CPU B100 causes the display unit B101 to display a frame count or the like (step S107), and the CPU B100 checks in step S109 whether a release switch RELSW is turned on.

Figure 12:
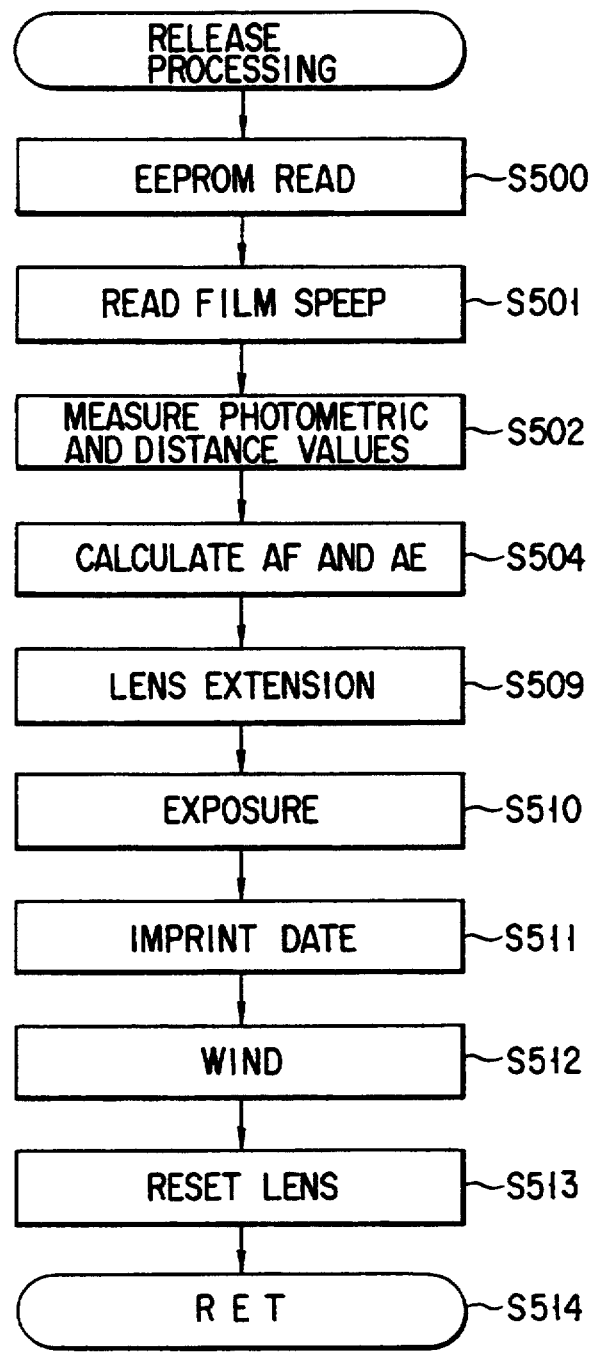
FIG. 12 is a flow chart of a release processing subroutine according to the first embodiment of the present invention.

When the release switch RELSW is turned on, the CPU B100 performs release processing (to be described in FIG. 12). When the RELSW is set in an OFF state, the flow immediately returns to step S101.

Step S103 of the idle supply operation will be described below. The CPU B100 reads out stored information from the EEPROM in the memory unit B103 (step 200), and the CPU B100 checks (step S201) whether the idle supply state flag is "1". The idle supply state flag ALJF is a flag stored in the EEPROM of the memory unit B103. When the battery is removed from the camera during the idle supply operation, and is loaded the camera again, the idle supply operation can be continued by detecting the flag.

When the idle supply state flag ALJF is "1", the flow advances to step S207 in the CPU B100, and the CPU B100 transmits information stored in the EEPROM in the memory unit B103 to an idle supply counter ALC. On the other hand, the flag ALJF is "0", the flow advances to step S202 in the CPU B100, an old idle supply state flag OALJF is cleared. When an idle supply operation is performed using the film cartridge shown in FIG. 6, the flag OALJF serves as a flag for determining whether a resupply operation is performed, e.g., when the film 72 is shortly supplied, when the film 72 is cut at the perforations 72a, and when the film 72 is not properly wound on the spool 57.

Although the CPU B100, in step S203, causes to rotate the motor M2 52 counterclockwise through the motor control circuit B104, and feeds the film 72 from the cartridge 70 to almost wind the film 72 on the spool 57, a detailed description thereof will be described later. The CPU B100 clears the idle supply counter ALC for counting the number of frames to be idly wound, the CPU B100 sets the idle supply state flag ALJF, and this state is stored in the EEPROM in the memory unit B103 (steps S204 to S206).

After the above initial processing is performed, the CPU B100 causes to drive the motor M1 51 clockwise to wind the film (step S208). When the motor M1 51 is rotated clockwise, the spool gear 57a is rotated through the pinion gear 53, the sun gear 54, and the planetary gear 55, thereby rotating the spool 57. After the CPU B100 causes to rotate the motor M1 51, a time TAL enough to mesh the perforations 72a of the film 72 with the lock pawls 57b formed on the spool 57 and to wind the film is set in a timer (step S209). In step S210, after the CPU B100 clears a perforation counter PFC, the CPU B100 checks a signal from the photoreflector (WPR) 69 for detecting the motion of the perforations 72a.

When a rise signal from the photoreflector (WPR) 69 is detected, the CPU B100 adds 1 to the perforation counter PFC (step S212), and determines in step S213 whether the counter value is set to be 8. When the counter value is less than 8, since the last frame is not wound, the flow returns to step S211 in the CPU B100. On the other hand, when the counter value reaches 8, the flow advances to step S214 in the CPU B100, the CPU B100 adds 1 to the internal idle supply counter ALC (step S214), and the CPU B100 writes the number of idly wound frames in the EEPROM in the memory unit B103 (step S215). The CPU B100 checks in step S216 whether the number of idly wounded frames reaches 4. When the number of idly wounded frames does not reach 4, the CPU B100 in step S217 sets the internal timer for a time required to wind one normal frame and starts the timer, and the flow returns to step S210.

In step S216, the idle supply counter reaches 4, the CPU B100 brakes the motor M1 51 and turns it off. Since the idle supply operation is finished, the flag ALJF is cleared, and the flow returns to the main routine after the flag and a frame count are stored in the EEPROM in the memory unit B103 (steps S218 to S235).

In step S211, when a rise signal from the photoreflector (WPR) 69 for detecting perforations is not input, after the CPU B100 performs the count-down operation of the timer in step S223, the CPU B100 checks in step S224 whether the time set in the timer has elapsed. When the time has not elapsed, the CPU B100 checks in step S237 whether the rear cover switch (BKSW) B138 is turned on. When the rear cover switch (BKSW)

B138 is set in an OFF state, the flow returns to step S211. When the rear cover switch (BKSW) B138 is ON, since the rear cover is open, after the CPU B100 brakes the motor M1 51 to immediately stop the motor M1 51, the motor M1 51 is turned off (steps S238 and S239), and the flow returns to the main routine (step S240). As described above, when the rear cover is set in an open state, since the supply operation of the film 72 caused by the motor M1 51 is immediately stopped, a nonexposed film portion is not unnecessarily exposed.

In step S224, when the time set in the timer has elapsed, after the CPU B100 brakes the motor M1 51 to immediately stop the rotation of the motor M1 51, the motor M1 51 is turned off. Thereafter, the CPU B100 checks in step S227 whether the counter value of the idle supply counter ALC is "0". If NO in step S227, the old idle supply state flag OALJF and the idle supply state flag ALJF are cleared, and the flow advances to the rewinding subroutine (steps S228 to S229). Although the film for one or more frames is idly supplied, the time set in the timer has elapsed because it is determined that the film is wound to its terminal end.

On the other hand, when the idle supply counter ALC has a value of "0" in step S227, in order to check whether a resupply operation is performed, the CPU B100 checks in step S230 whether the old idle supply state flag OALJF is set to be "1". When the flow advances to the idle supply subroutine for the first time, the flag OALJF is cleared in step S220. For this reason, when the flow advances to step S230 for the first time, "NO" is determined. Thereafter, the CPU B100 sets the flag OAJF, and a value obtained by subtracting α (a proper value is stored as a in the EEPROM in the memory unit 103) from a predetermined number is transmitted to the internal perforation counter PFC. After a resupply subroutine (to be described in FIG. 10) is executed, the flow returns to step S204, and the idle supply subroutine is executed again.

When the old idle supply flag OALJF is set to be "1", although the CPU B100 performs a resupply operation, an idle supply operation is not performed. Therefore, the flow advances to step S228 to perform a rewinding operation.

Figure 10:
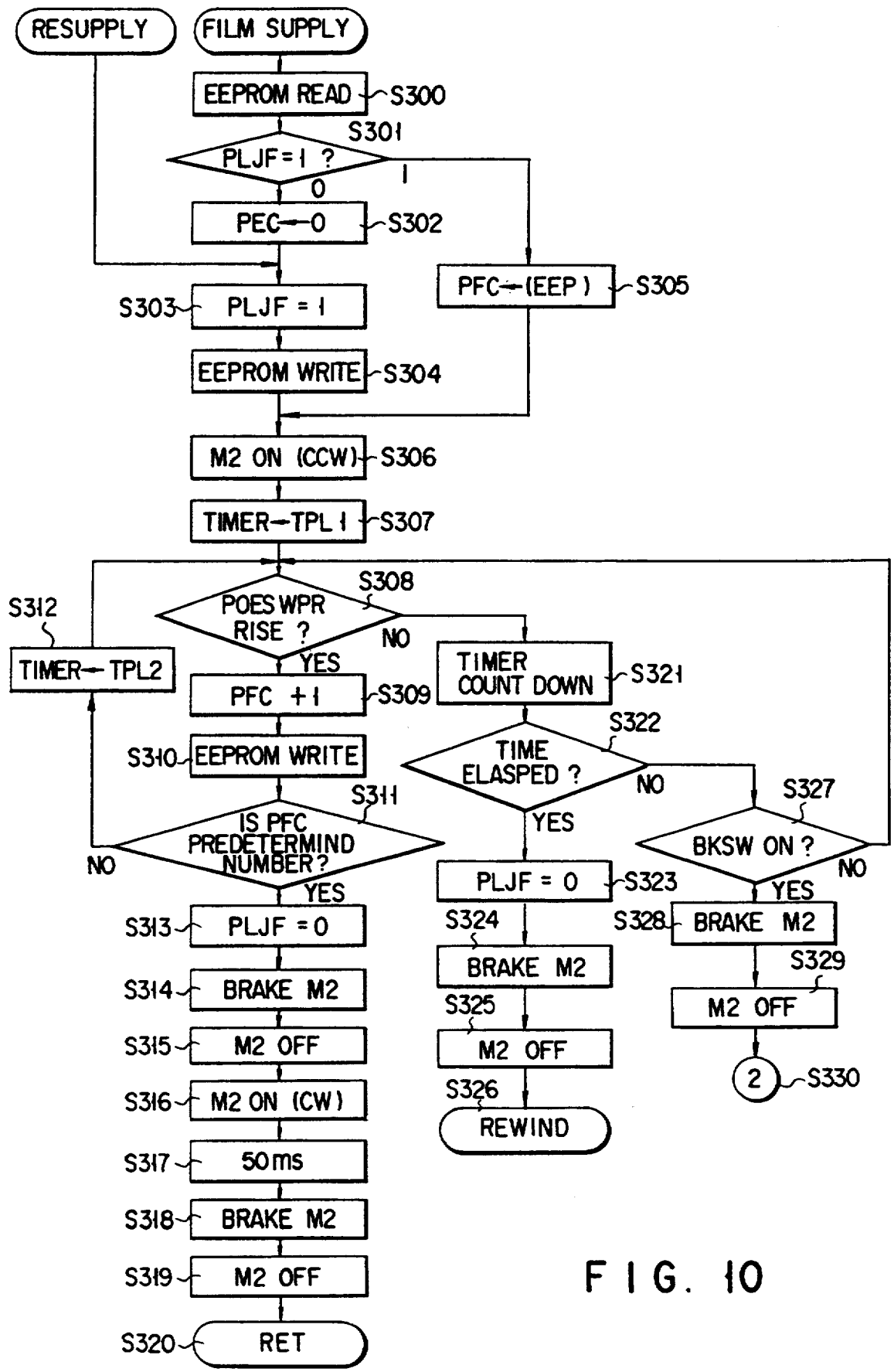
FIG. 10 is a flow chart of a film supply/resupply subroutine according to the first embodiment of the present invention.

Film supply and resupply subroutines will be described below with reference to FIG. 10. The film supply subroutine is a routine for executing step S203 in an idle supply operation. In this subroutine, when the idle supply operation is to be performed, the motor M2 52 is rotated counterclockwise, and the film 72 is wound on the spool 57. On the other hand, in the resupply subroutine, although an idle supply operation is performed, when even one frame is not wound, a supply operation is performed again.

In step S300, the CPU B100 reads out stored information from the EEPROM in the memory unit B103 and checks whether the film supply state flag PLJF is set to be "1. When the film supply state flag PLJF is set to be "1", since the film is being supplied, the CPU B100 transmits a perforation counter value stored in the EEPROM in the memory unit B103 to the perforation counter PFC. On the other hand, when the film supply state flag PLJF is set to be "0", after the perforation counter is cleared, the film supply state flag PLJF is set, and information in the counter PFC and the flag PLJF are written in the EEPROM in the memory unit B103.

The above initial processing is finished, the CPU B100 rotates the motor M2 52 counterclockwise to rotate the film supply coupler 64, thereby supplying the film 72. The CPU B100 sets a time TPL1 required to feed the film in the timer. This time TPL1 set in the timer is set to be long enough to allow the film 72 supplied from the cartridge 70 to reach the perforation detecting photoreflector 69.

In step S308, the CPU B100 checks a rise signal of the perforation detecting element (photoreflector) WPR 69. When the CPU B100 detects the rise signal, the CPU B100 adds 1 to the internal perforation counter PFC, the updated perforation counter value is written in the EEPROM in the memory unit B103, and the CPU B100 checks whether the value of the perforation counter PFC reaches a predetermined value.

When the value of the counter PFC does not reach the predetermined value, the CPU B100 determines that the film 72 reaches the photoreflector WPR 69 during the film supply operation, the CPU B100 sets a time TPL2 shorter than the time TPL1 in the timer, and the flow returns to step S308.

When the value of the counter PFC reaches the predetermined value, the CPU B100 determines that the film 72 is supplied to be wound on the spool 57. First, the CPU B100 clears the flag PLJF representing a film supply state, and the CPU B100 brakes the motor M2 52, and the motor M2 52 is turned off to stop the drive of the spool caused by the motor M2 52. The CPU B100 drives the motor M2 52 clockwise to cause the planetary gear to be free. 50 ms later, the motor M2 52 is braked, and is turned off, and the flow returns to the main routine (steps S313 to S320).

The flow returns to step S308, the CPU B100 performs the count-down operation of the timer when no rise signal of the photoreflector WPR 69 is detected, and the CPU B100 checks in step S322 whether the time has elapsed. If NO in step S322, the CPU B100 checks whether the rear cover switch BKSW is set in an ON state. When the rear cover switch BKSW is set in an OFF state, the flow returns to step S308. Since the processing speed of the CPU is higher than detection of the signal of the photoreflector WPR 69, the CPU B100 repeats the processing in steps in an order of S308, S321, S327, and S308.

When it is detected in step S322 that the time has elapsed, the CPU S100 determines that the film supply operation has failed, the flag PLJF is reset, and the motor M2 52 is braked. Thereafter, the motor M2 52 is turned off, and the flow advances to a rewinding subroutine.

When the rear cover is set in an open state, the CPU B100 determines "YES" in step S327, and the flow advances to step S328. After the motor M2 52 is braked, the motor M2 52 is turned off, and the flow returns through step S235. As described above, even when the rear cover is erroneously opened during the film supply operation, since the CPU B100 stops the rotation of the motor M2 52 in steps S327 to S329, the supply operation of the film 72 is stopped, and a nonexposed film portion is not unnecessarily exposed. When the rear cover is closed again, and the rise signal of the rear cover switch BKSW is detected in step S102, the flow advances to the idle supply subroutine. At this time, since the flag ALJF is not set, the CPU B100 performs a film supply operation again in step S203.

Figure 11:
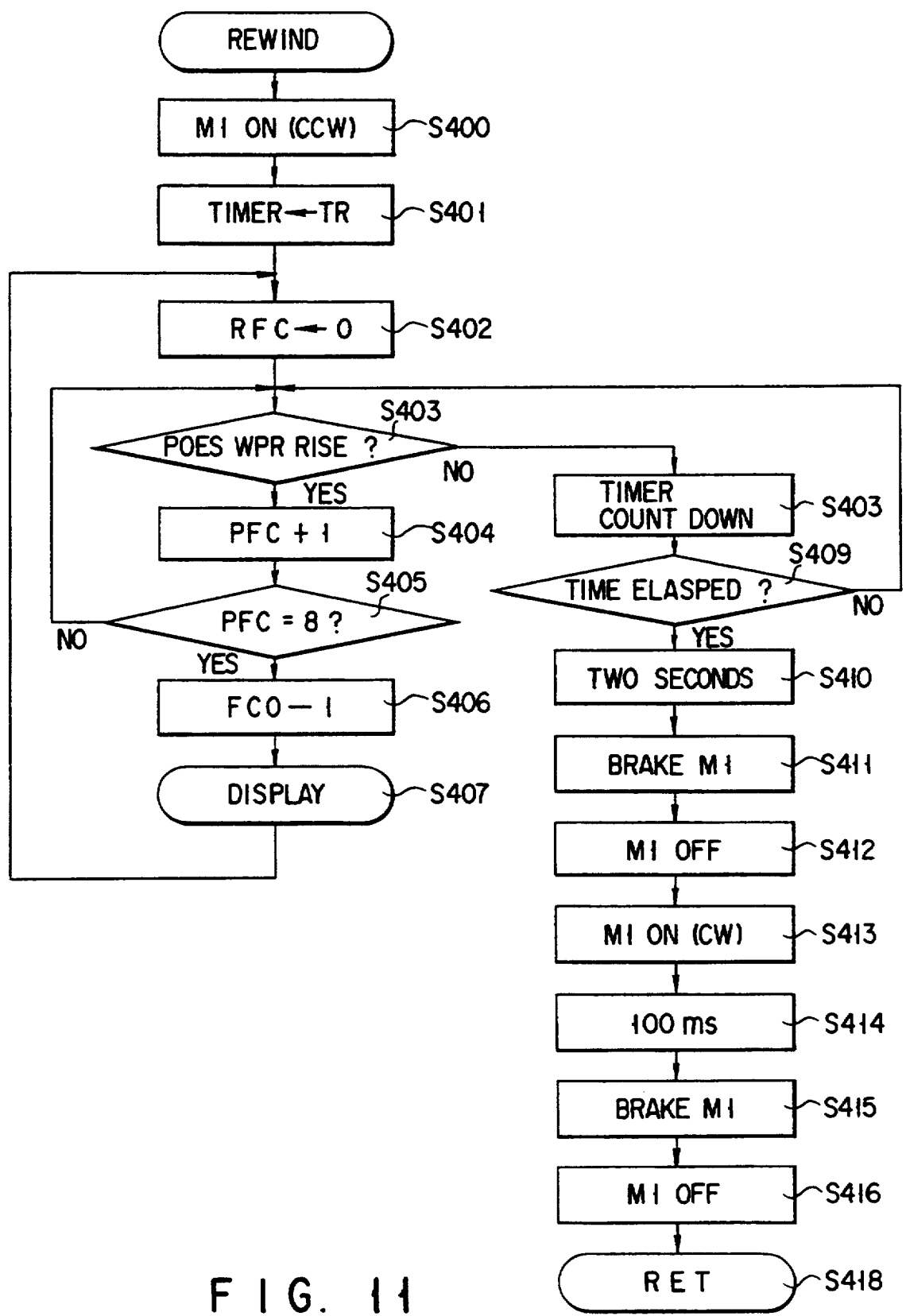
FIG. 11 is a flow chart of a rewinding subroutine according to the first embodiment of the present invention.

A film rewinding subroutine will be described below with reference to FIG. 11. The CPU B100 drives the motor M1 51 counterclockwise in step S400, sets a time TR' required to rewind the film in the timer, and clears the perforation counter PFC.

The CPU B100 checks whether the rise signal of the photoreflector (WPR) is detected. When the rise signal is detected, the CPU B100 adds 1 to the perforation counter PFC, and the CPU B100 checks whether the counter value reaches 8. When the counter value does not reach 8, the flow returns to step S403 in the CPU B100. When the counter value reaches 8, since the film is rewound by one frame, the CPU B100 subtracts 1 from the film counter FCO and causes a frame count to be displayed on the display unit B101, and the flow returns to step S402.

When the rise signal of the photoreflector WPR 69 is not detected, the CPU B100 performs the count-down operation of the timer in step S408 and checks whether a time has elapsed. When the time has not elapsed, the flow returns to step S403.

When the time has elapsed, although the CPU B100 almost completes the film rewinding operation, the CPU B100 waits for a time, e.g., 2 seconds, required to perfectly store the film 72 in the film cartridge 70, and the CPU B100 brakes the motor M1 51 and turns off the motor M1 51. The CPU B100 drives the motor M1 51 clockwise to cause the planetary gear to be free, and in this state, the CPU B100 waits for, e.g., 100 ms. When this time has elapsed, the motor M1 51 is braked and turned off, and the flow returns to the main routine.

The release processing subroutine will be described below with reference to FIG. 12. The CPU B100 reads out data, required for calculation, from the EEPROM in the memory unit B103, and the CPU B100 causes the film speed reading unit B115 to read a film speed from the film cartridge 70. Thereafter, the CPU B100 causes the distance measuring unit B128 and the photometric unit B127 to respectively perform a distance measuring operation and a photometric operation to obtain a distance measurement value and a photometric value. A lens extension amount is calculated on the basis of the obtained distance measurement value, and an exposure time is calculated on the basis of the photometric value.

The CPU B100 rotates the motor M2 52 clockwise in step S509 to extend the focusing lens B123. An extension amount of the lens is set as follows. That is, the CPU B100 counts the number of pulses generated by the lens drive detection unit B124, and the drive of the motor M2 52 is stopped when the number of the pulses reaches a value corresponding to the extension amount calculated in step S504. Note that, when a single-lens reflex camera is used, a mirror-up operation is performed at this time.

The CPU B100 transmits a signal to the sector driving unit B121 to drive the sectors B129 and to perform exposure. The CPU B100 transmits a signal to the electronic flash controller B132 as needed, and causes the electronic flash to emit light. When the exposure is completed, the CPU B100 causes the date-imprinting unit B102 to imprint the date on the film, and rewinds one frame of the film 72 (in FIG. 13). In addition, the CPU B100 causes the focusing lens B123 to return to an initial position (step S513), and the flow returns to the main routine.

A rewinding subroutine will be described below with reference to FIG. 13. When the CPU B100 rotates the motor M1 51 clockwise, the spool 57 starts a rewinding operation of the film. At this time, the CPU B100 sets a time TW required to rewind one frame in the timer, and clears the perforation counter PFC.

The CPU B100 checks whether a rise signal of the photoreflector WPR 69 is detected. When the rise signal is detected, the CPU B100 adds 1 to the counter PFC, and checks whether the value of the counter PFC is set to be "8". When the value does not reach "8", the CPU B100 determines that one frame is not wound, the flow returns to step S603. When the value of the counter PFC reaches "8", the CPU B100 determines that one frame is wound, and the CPU B100 stops the motor M1 51 (steps S606 and S607). The CPU B100 adds 1 to the film counter FCO, and the flow returns to the main routine.

When the rise signal of the photoreflector WPR 69 is not detected, the CPU B100 performs the count-down operation of the timer, and checks in step S611 whether a time has elapsed. If NO in step S611, the flow returns to step S603 in the CPU B100. On the other hand, if YES in step S611, the motor M1 is stopped (steps S612 and S613), and the flow advances to the rewinding subroutine because it can be determined that the film is wound to its terminal end, since one frame is not wound even when the time TW required to wind one frame has elapsed.

The second embodiment of the present invention will be described below. The second embodiment exemplifies a camera (e.g., referring to U.S. Pat. No. 4,947,196) using a film whose rear surface has a magnetic coating portion, and a film feed amount signal is magnetically recorded on the magnetic coating portion.

Figure 14:
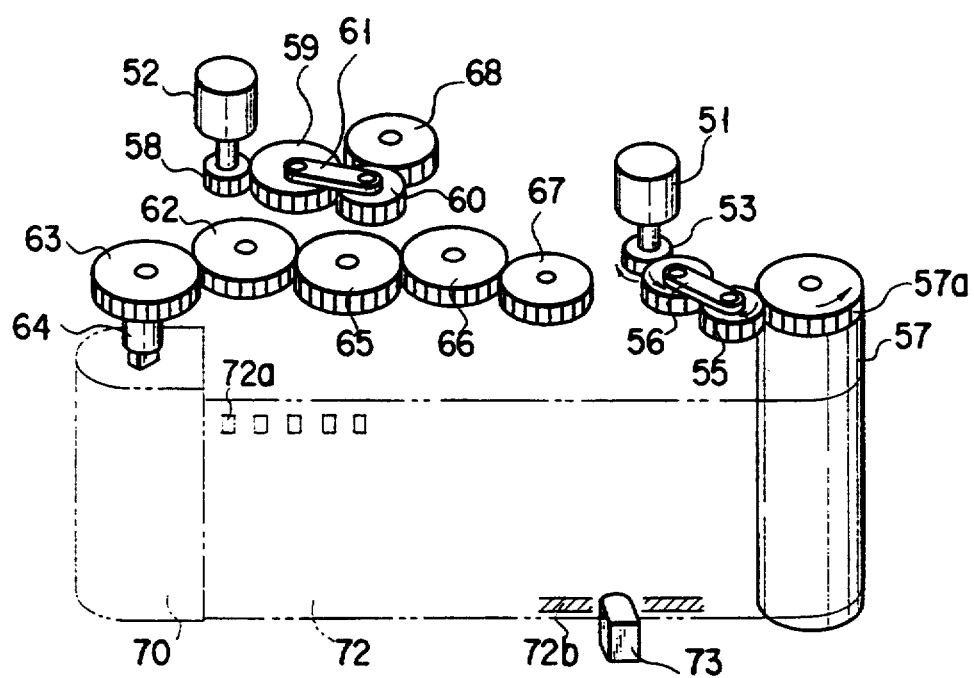
FIG. 14 is a perspective view showing a feeding apparatus according to the present invention when viewed from the back.
Figure 15:
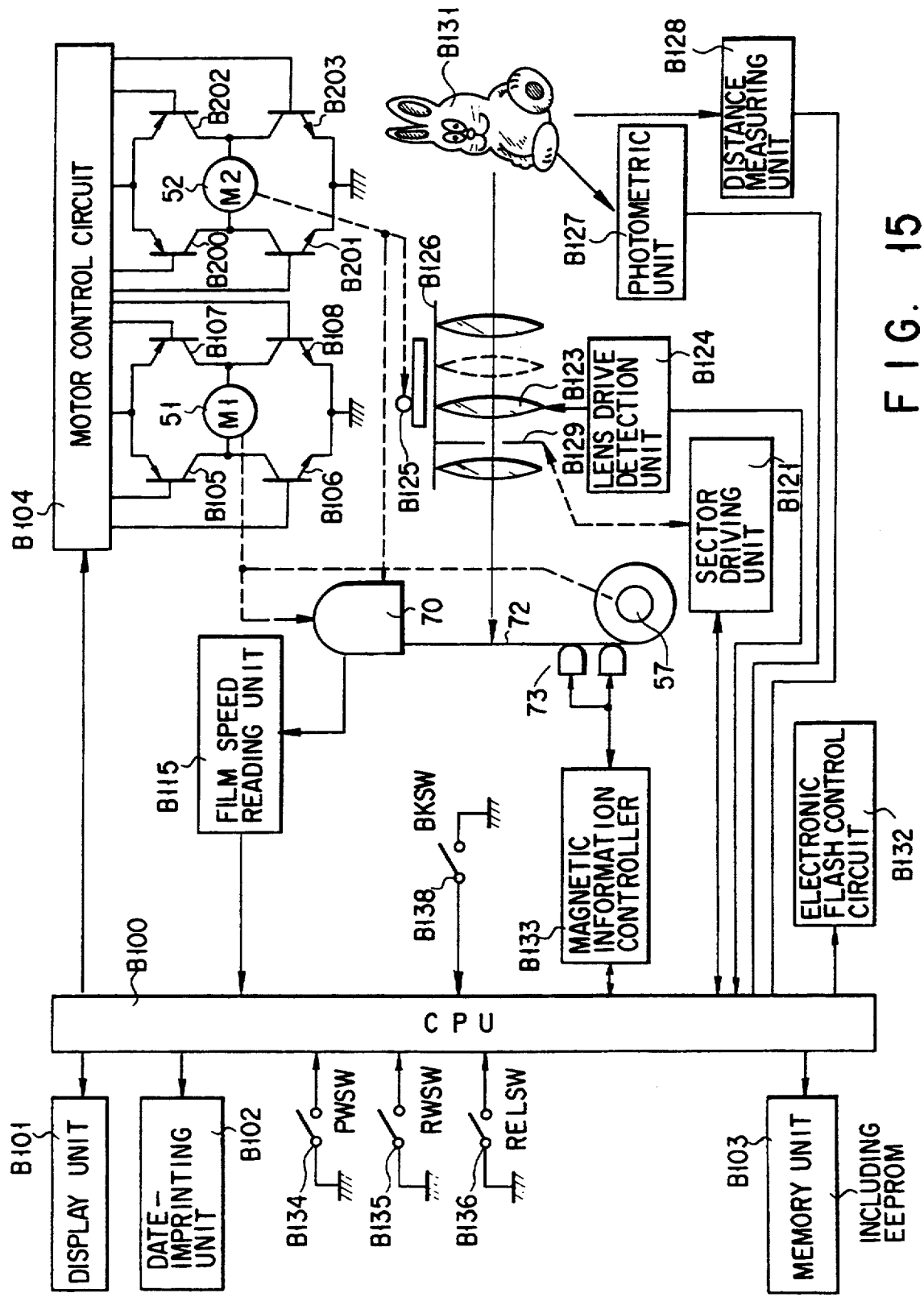
FIG. 15 is a block diagram showing an electrical circuit according to the second embodiment of the present invention.

FIG. 14 is a perspective view showing the camera when viewed from the back in a state wherein the film is wound. A magnetic head 73 for reading the feed amount from a magnetic recording medium of a film 72 having a magnetic coating portion 72b is arranged on a film pressure plate (not shown) or in the rear cover. The block diagram of an electrical circuit according to the second embodiment of the present invention is shown in FIG. 15. FIG. 14 showing the second embodiment and FIG. 2 showing the first embodiment have the following different points. That is, the magnetic head 73 and a magnetic head controller B133 for controlling the magnetic head 73 are arranged in the second embodiment. Since any other arrangement of the second embodiment is the same as that of the first embodiment, the same reference numerals as in the first embodiment denote the same parts in the second embodiment, and a detailed description thereof will be omitted.

The detailed circuit diagram of the magnetic head controller B133 is shown in FIG. 16. In FIG. 16, reference symbols B400 and B402 denote buffers arranged between the ports of a CPU B100 and magnetic heads B406 and B409 corresponding to the magnetic head 73, and reference symbols B401 and B403 are hysteresis comparators for shaping the waveforms of signals from the magnetic heads B406 and B409. In addition, reference symbols B404 and B407 denote analog switches for performing a switching operation in response to a write/read control signal (R/W signal) from the CPU B100. The write/read control signal is set to be "1" in write access, and the write/read control signal is set to be "0" in read access. Reference symbol B406 denotes the magnetic head for writing/reading a signal, and reference symbol B409 denotes the magnetic head for writing/reading a sync signal.

Figure 18:
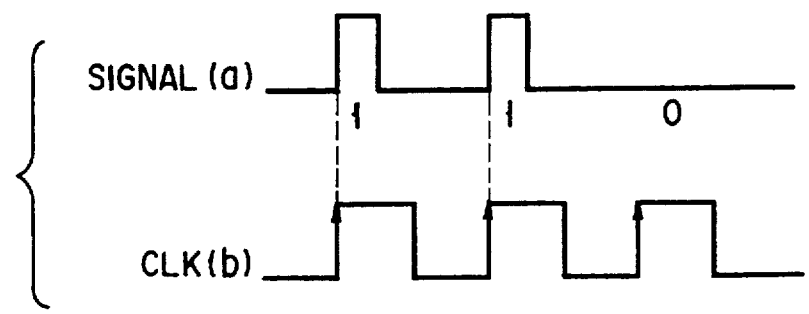
FIG. 18 is a timing chart showing an operation of the magnetic information controller shown in FIG. 16.
Figure 19:
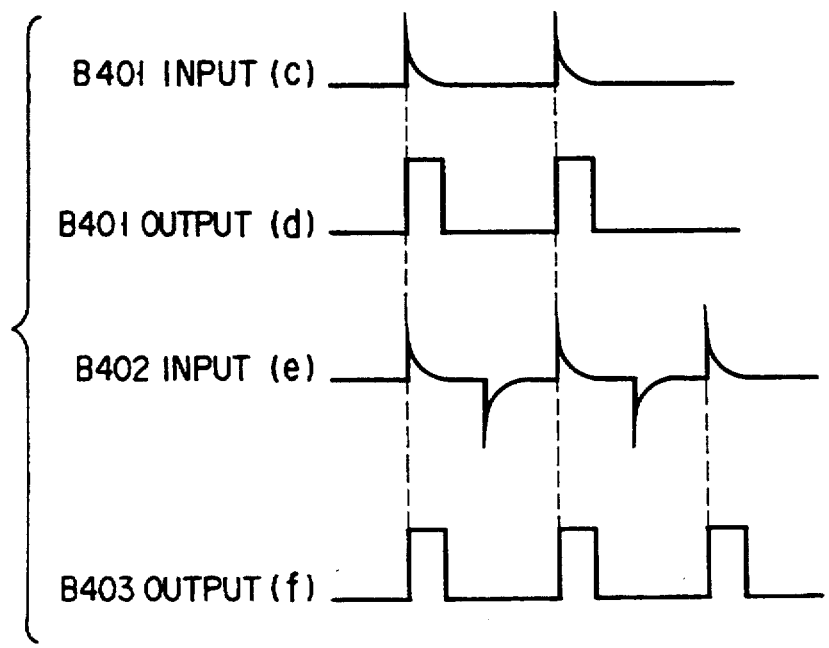
FIG. 19 is a timing chart showing an operation of the magnetic information controller shown in FIG. 16.

In an operation of writing signals by the magnetic heads B406 and B409, as shown in FIG. 18, a signal (a) "1" or "0" is written by the magnetic head B406 in synchronization with a clock signal CLK (b) from the CPU B100, i.e., in synchronization with the leading edge of the signal CLK (b). In addition, in read access, the CPU B100 transmits its R/W control signal to respectively switch the analog switches B404 and B407 to terminals 2. When the written signal is read by the magnetic heads, the waveforms shown in FIGS. 19(c) and 9(e) are obtained from the magnetic heads B406 and B409. In addition, the waveforms are shaped by the hysteresis comparators B401 and B403 into the waveforms shown in FIGS. 19(d) and 19(f), and the shaped waveforms are received by the CPU B100 as signals. As described above, since a signal is written and read in synchronism with the clock signal CLK (b), even if the winding speed of the film 72 varies, data can be accurately read.

Note that the above operation can be performed using a film on which a sync signal is magnetically recorded in advance as shown in FIG. 17. In this case, reference symbol B410 denotes a buffer arranged between a magnetic head B415 and a port of the CPU B100, and reference symbols B411 and B412 denote hysteresis comparators for shaping the waveforms of signals from the magnetic head. In addition, reference symbol B413 denotes an analog switch switched in response to the R/W signal from the CPU B100, and the switch B413 is set to be "0" in write access, and is set to be "0" in read access. Reference symbol B415 denotes a magnetic head for writing/reading a signal, and reference symbol B417 denotes a magnetic head for reading a sync signal.

Since the second embodiment of the present invention arranged as described above is obtained by replacing the photoreflector WPR 69 for detecting the film perforations 72a in the first embodiment with a magnetic head 73 for detecting a feed amount signal magnetically recorded on the film 72, the operation of the second embodiment is the same as that of the first embodiment, and a detailed description thereof will be omitted.

The third embodiment of the present invention will be described below. In the third embodiment, by using one motor and a sun-planetary gear mechanism, a film winding operation, a film rewinding operation, a driving operation of a photographic lens are to be performed. The arrangement of the third embodiment will be described below using FIG. 20.

A first gear arm 202 is fitted on the rotational center of a first sun gear 201 to which the driving force of a motor 200 is transmitted directly or through a gear train, a first planetary gear 203 is slidably and axially supported by one end of the first gear arm 202, and the other end of the first gear arm 202 can be brought into slidable contact with a stop lever 204 pivotally and axially supported by a fixed member of a camera body. The first planetary gear 203 pivots about the sun gear 201, and the first planetary gear 203 can be meshed with a first driven gear 205 for feeding a film, a driven gear 206 for a photographic operation, a second driven gear 207 for feeding a film, and a load internal gear 208. The first stop lever 204 is biased counterclockwise by a toggle spring 209. In a normal state, the first stop lever 204 is in contact with a stopper 210a, and the first stop lever 204 is stopped by a stopper 210b when the first stop lever 204 pivots clockwise. In addition, the pivot range of the first gear arm 202 is limited by stoppers 211a and 211b.

Idle gears 212 and 213 are arranged between the first driven gear 205 for feeding a film and the second driven gear 207 for feeding a film, and a second sun gear 214 is meshed with the first driven gear 205 for feeding a film.

A second gear arm 219 is pivotally fitted on the pivotal center of the second sun gear 214, the second gear arm 219 pivotally supports second planetary gears 220a and 220b, and the second planetary gears 220a and 220b are meshed with the second sun gear 214. The second planetary gear 220a is meshed with a coupler gear 221 engaged with a film in the pivot path of the coupler gear 221.

The second sun gear 214 is meshed with a third sun gear 215, a third gear arm 216 is pivotally and axially supported on the pivotal center of the third sun gear 215, and the third gear arm 216 pivotally and axially supports a third planetary gear 217. The pivot range of the third gear arm 216 is limited by a stopper 211c when the third gear arm 216 pivots clockwise, and the third gear arm 216 is meshed with the third planetary gear 217 and a spool gear 218 integrally coupled with a spool.

An operation of a sun-planetary gear mechanism according to the third embodiment arranged as described above will be described below with reference to FIGS. 20 to 23. In a film winding state, when the motor 200 is rotated, the first sun gear 201 is rotated clockwise as indicated by the arrow in FIG. 20, the first gear arm 202 is held in the state in FIG. 20, and an output from the first sun gear 201 is transmitted to the second sun gear 214 through the first planetary gear 203 and the first driving gear 205 for feeding a film. In addition, the clockwise rotation of the second sun gear 214 is transmitted to the coupler gear 221 through the second planetary gear 220a. When a film is automatically loaded, the film is supplied from a film cartridge by the clockwise rotation of the coupler gear 221 to reach the spool 218. When the film is wound on the spool 218, the spool is driven by using the peripheral velocity difference between the spool 218 and the coupler gear 221.

That is, the coupler gear 221 and the spool gear 218 are driven by the second sun gear 214 have different rotational speeds because the gear ratios of the gears 220a, 215, and 217 arranged between the coupler gear 221 and the spool gear 218 are different from each other. The film is supplied by the coupler gear 221 until the film is wound on the spool. When the film is wound on the spool 218, since the rotational speed of the spool 218 is higher than that of the coupler gear 221, the film is wound at this speed. On the other hand, since the coupler gear 221 is rotated by the film at a speed higher than that driven by the second sun gear 214, the second planetary gear 220a cannot be meshed with the coupler gear 221.

A film feeding operation is controlled by a photoreflector (not shown), a one-frame detection switch interlocked with a driven sprocket, and the like.

A photographic operation state will be described below. In the state in FIG. 20, when an automatic loading operation or a one-frame winding operation is completed, and the shutter is released for the next photographic operation, the first sun gear 201 is rotated clockwise, and the state shown in FIG. 21 is obtained. Focusing and shutter operations are performed by rotating the driven gear 206 for a photographic operation. When the photographic operation is completed, the first sun gear 201 is rotated counterclockwise, the state returns to the state shown in FIG. 20, and a one-frame winding operation is performed. Therefore, the film feeding state shown in FIG. 20 and the photographic operation state are alternately performed.

A case wherein the film is wound to the film end, i.e., its terminal end during a film winding operation will be described below. When the film is wound to its terminal end during the film winding operation in the state shown in FIG. 20, the spool 218 is locked by a load generated when the film is wound to its terminal end, and the first gear arm 202 rotates the stop lever 204 clockwise against the spring force of the toggle spring 209 to obtain the state shown in FIG. 22.

Figure 22:
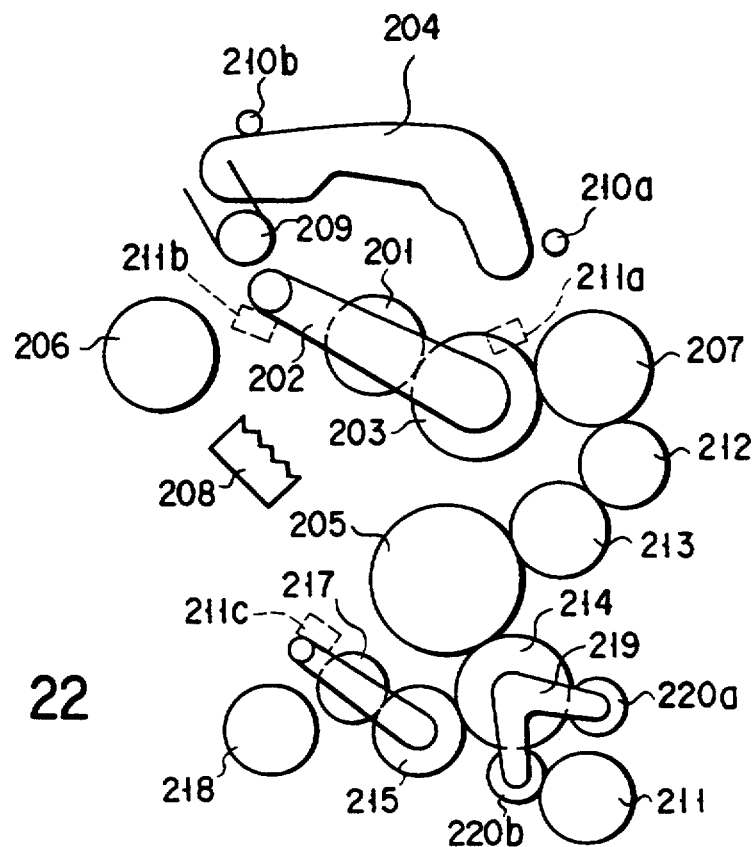
FIG. 22 is a plan view showing the sun-planetary gear mechanism of the feeding apparatus for the camera in a film rewound state according to the third embodiment of the present invention.

In the film rewinding state shown in FIG. 22, the first sun gear 201 is rotated counterclockwise as in the film winding operation, this rotation is transmitted to the driven gear 207 for feeding a film. The driving force of the driven gear 207 is transmitted to the first driven gear 205 for feeding a film. However, in this case, the idle gears 212 and 213 drive the driven gear 205 in the clockwise direction which is opposite to the rotational direction in the film winding operation.

In addition, the driving force of the driven gear 205 for feeding a film is transmitted to the second sun gear, and the third planetary gear 217 is separated from the spool gear 218 by the counterclockwise rotation of the second sun gear 214, thereby causing the spool gear 218 to be free. In addition, the second planetary gear 220b is meshed with the coupler gear 221 to rotate the coupler gear 221 counterclockwise, thereby rewinding the film. Completion of the film rewinding operation is detected by the photoreflector PR, the one-frame detection switch, and the like.

Figure 23:
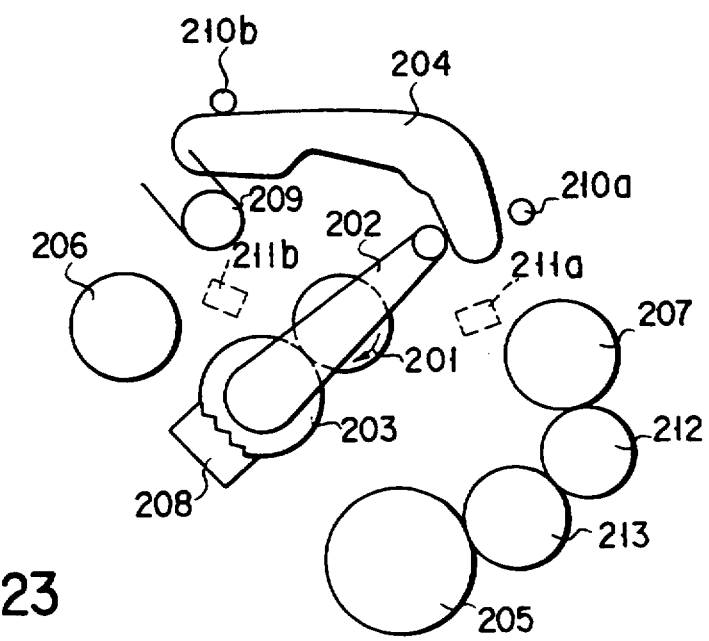
FIG. 23 is a plan view showing the sun-planetary gear mechanism of the feeding apparatus for the camera in a state wherein the whole driving system is reset according to the third embodiment of the present invention.

FIG. 23 shows a state wherein the whole driving system is reset. When the rewinding operation is completed in the state shown in FIG. 22, the first sun gear 201 is rotated clockwise, the first planetary gear 203 is meshed with load internal gear 208, and the load of the load internal gear 208 causes the first gear arm 202 to rotate the first stop lever 204 counterclockwise against the spring force of the toggle spring 209, thereby resetting the whole driving system.

Figure 24:
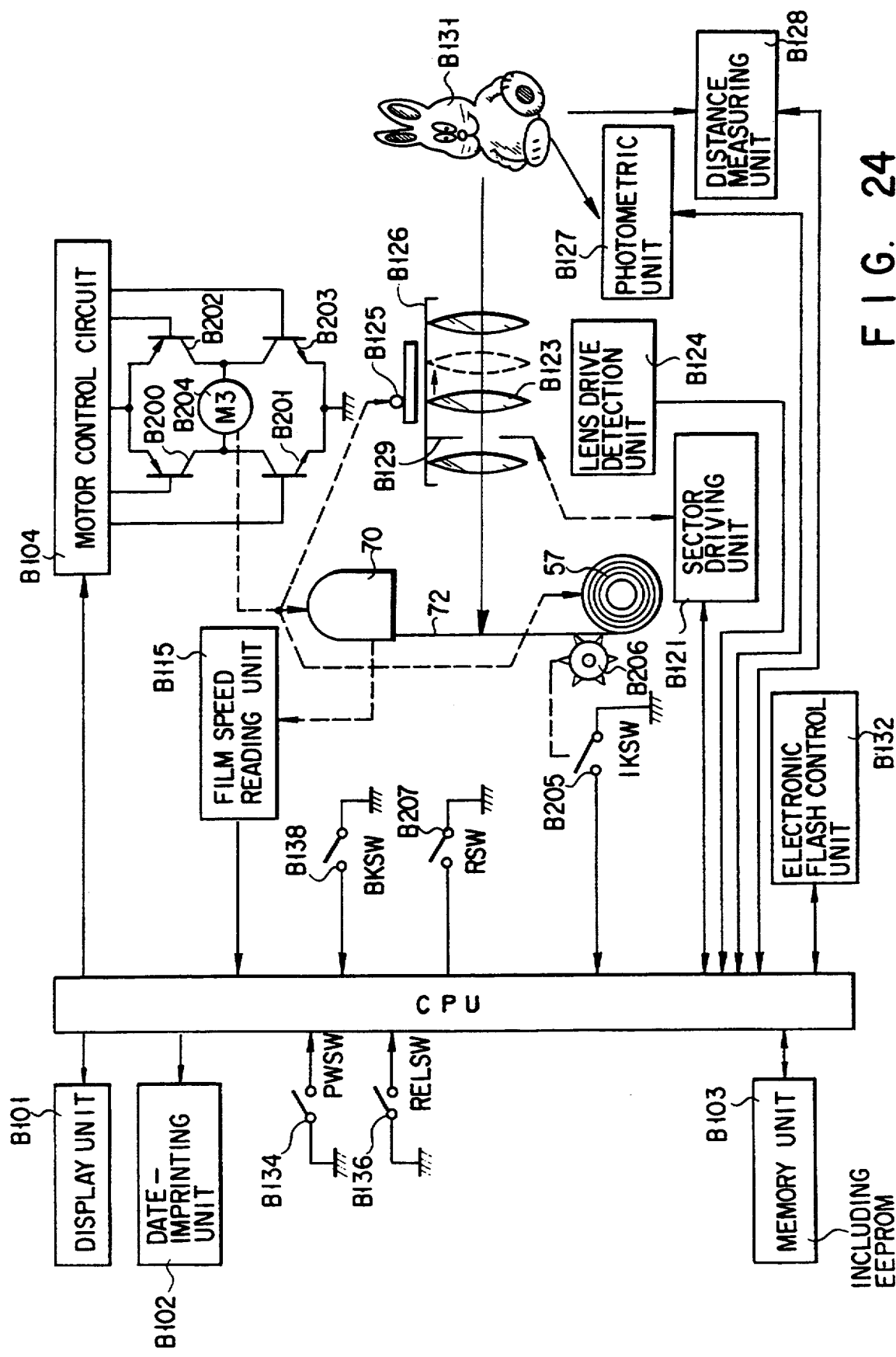
FIG. 24 is a block diagram of an electrical circuit according to the third embodiment of the present invention.

The block diagram of an electrical circuit according to the third embodiment of the present invention is shown in FIG. 24. Since this block diagram of the electrical circuit is the same as that shown in FIG. 7, only the different points between these electrical circuits will be described below.

Figure 20:
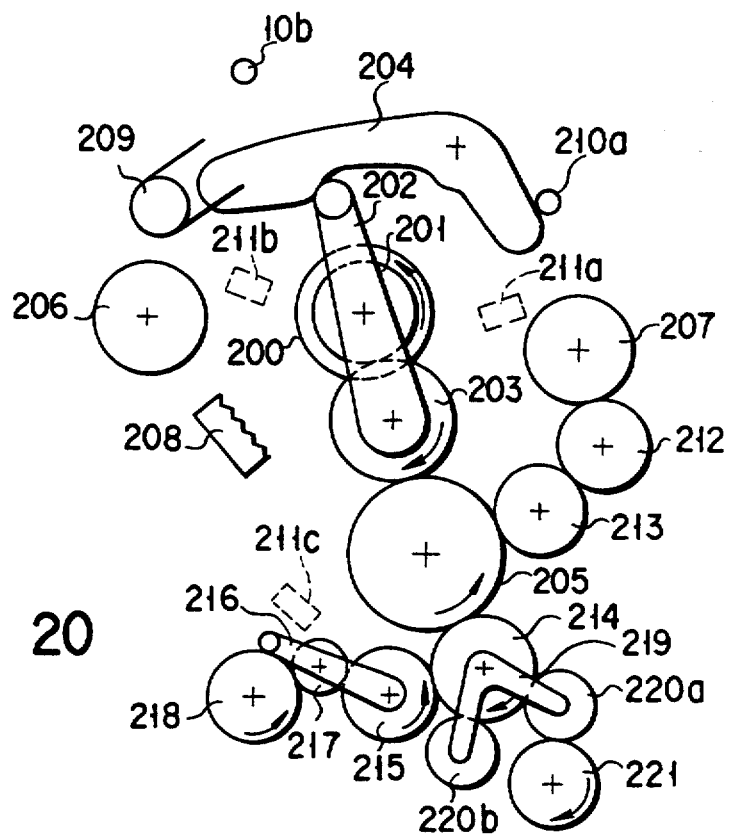
FIG. 20 is a plan view showing a sun-planetary gear mechanism of a feeding apparatus for a camera in a film wound state according to the third embodiment of the present invention.
Figure 21:
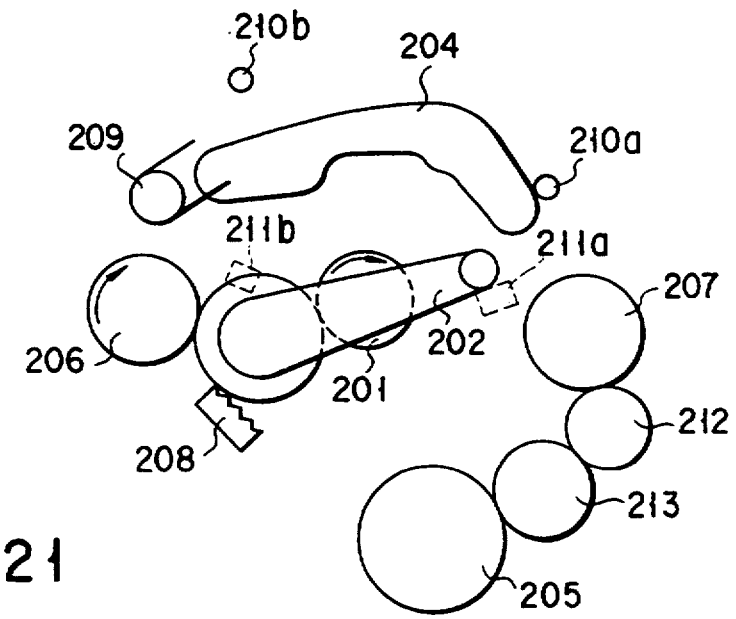
FIG. 21 is a plan view showing the sun-planetary gear mechanism of the feeding apparatus for the camera set in a photographic operation state according to the third embodiment of the present invention.

Only a motor M3 B204 shown as a motor 200 in FIG. 20 is controlled by a motor control circuit B104, and a motor bridge circuit constituted by transistors B200, B201, B202, and B203 is connected to the motor control circuit B104. In the bridge circuit, the motor M3 B204 is rotated counterclockwise by turning on the transistors B200 and B203, the motor M3 B204 is rotated clockwise by turning on the transistors B201 and B202, and the motor M3 B204 is braked by turning on the transistors B201 and B203.

Reference symbol B205 denotes a one-frame winding detection switch, and reference symbol B206 denotes a driven sprocket. In addition, as shown in FIG. 22, reference symbol B207 denotes a switch which is turned on in the film rewinding state. For example, the switch B207 is turned on when the stop lever 204 is stopped by the stopper 210b, and the switch B207 is turned off in the film winding state as shown in FIG. 20.

An operation of the third embodiment arranged as described above will be described below with reference to flow charts. A main routine shown in FIG. 25 has the same flow as that in FIG. 8. After a CPU B100 performs initial setting in step S701, the CPU B100 checks in step S702 whether a rise signal from a rear cover detection switch BKSW B138 is detected. Since the signal rises immediately after the rear cover is closed, in this case, the CPU B100 performs an idle supply operation in step S708. This idle supply operation will be described in FIGS. 26 and 27.

If NO in step S702, the CPU B100 checks in step S703 whether a power switch PWSW B134 is turned on. If NO in step S703, the CPU B100 sets a stop state in step S704 to stop the operation of the whole camera. If YES in step S703, after the CPU B100 causes a display unit B101 to perform a predetermined display operation, the CPU B100 checks in step S706 whether a release switch RELSW B136 is ON. If YES in step S706, release processing is performed (step S707). On the other hand, if NO in step S706, the flow returns to step S702.

Figure 26:
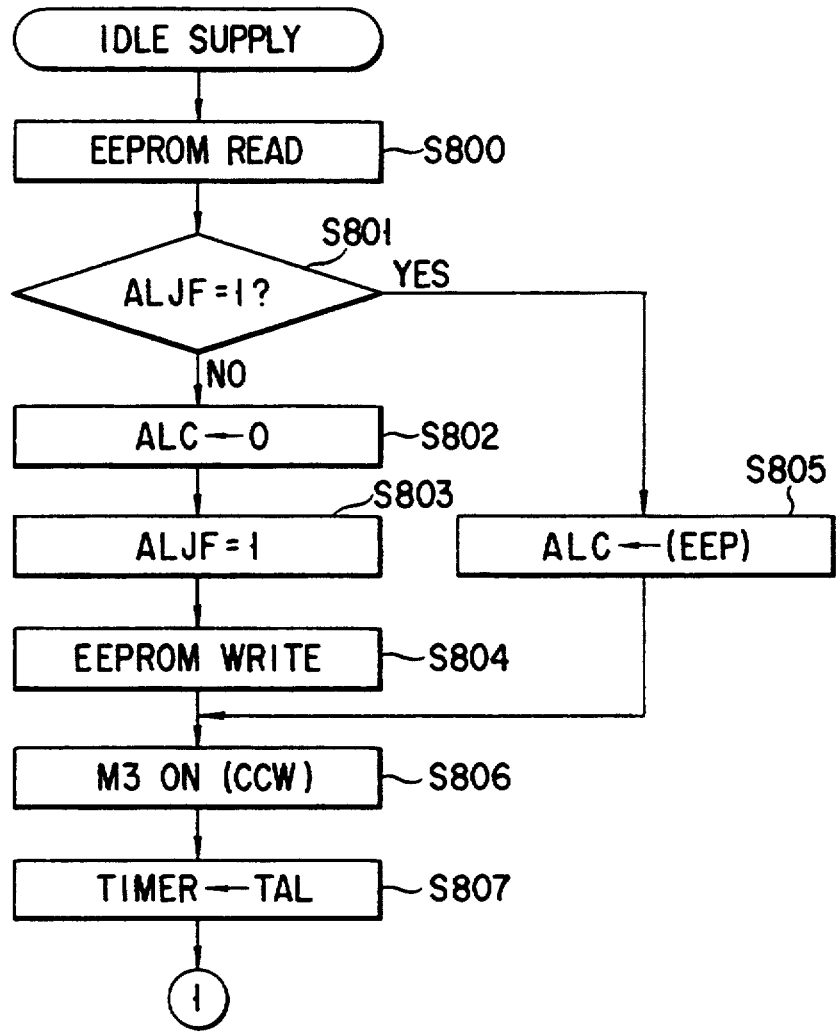
FIG. 26 is a flow chart of an idle supply subroutine according to the third embodiment of the present invention.
Figure 27:
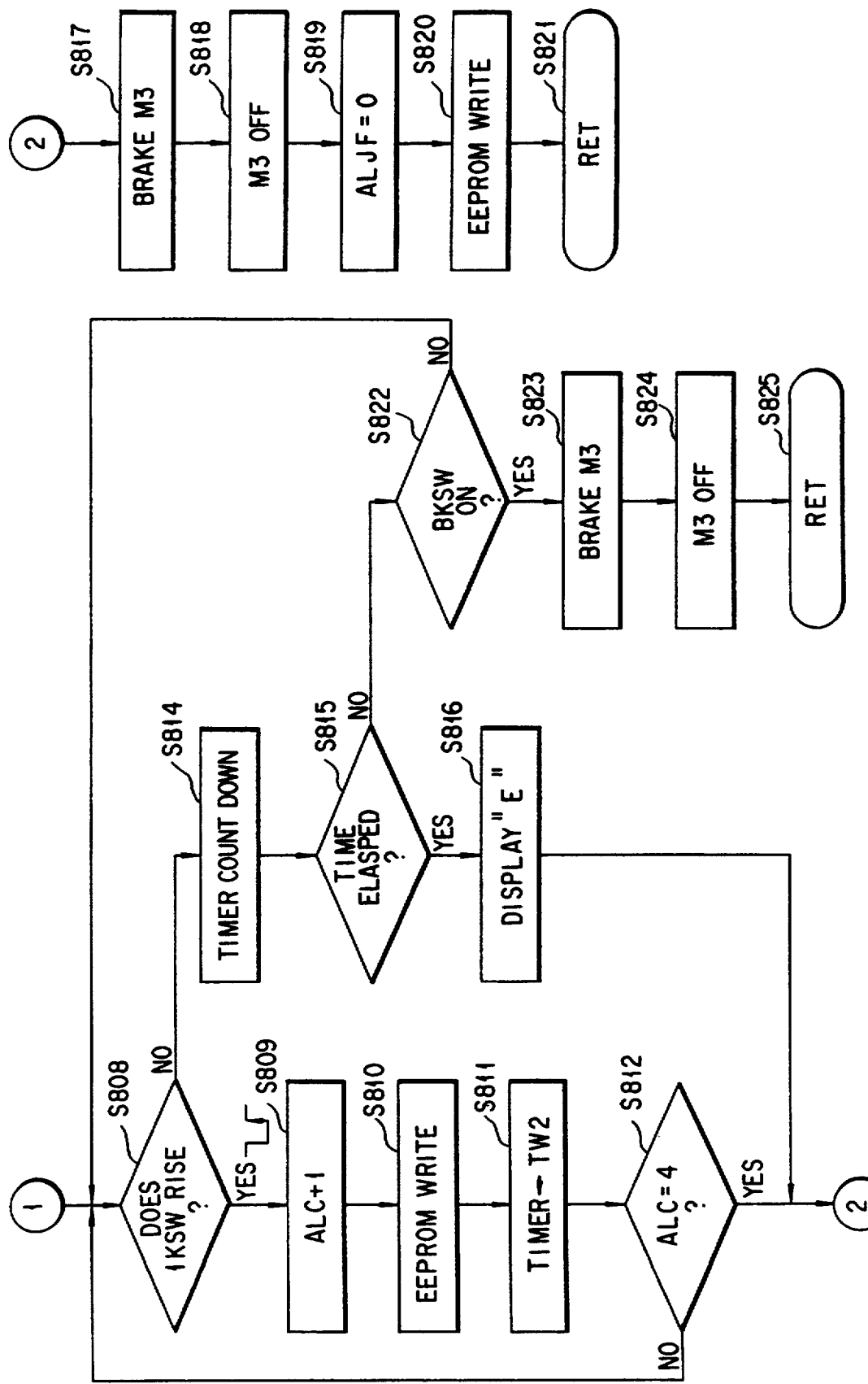
FIG. 27 is a flow chart of the idle supply subroutine according to the third embodiment of the present invention.

An idle supply operation in step S708 will be described below in detail with reference to FIGS. 26 and 27. The CPU B100 reads out information written in an EEPROM in a memory unit B103. The CPU B100 detects an idle supply state flag ALJF which is set to be "1" during the idle supply operation. When the flag ALJF is set to be "1", data of the number of idly supplied frames stored in the EEPROM in the memory unit B103 is transmitted to an idle supply counter ALC in step S805. On the other hand, when the flag ALJF is set to be "0", the CPU B100 transmits "0" to the idle supply counter ALC (step S802), the idle supply state flag ALJF is set to be "1" (step S803), and the above information is written in the EEPROM in the memory unit B103 (step S804). Thereafter, the CPU B100 rotates the motor M3 B204 counterclockwise, and sets a time TAL in a timer.

Figure 9:
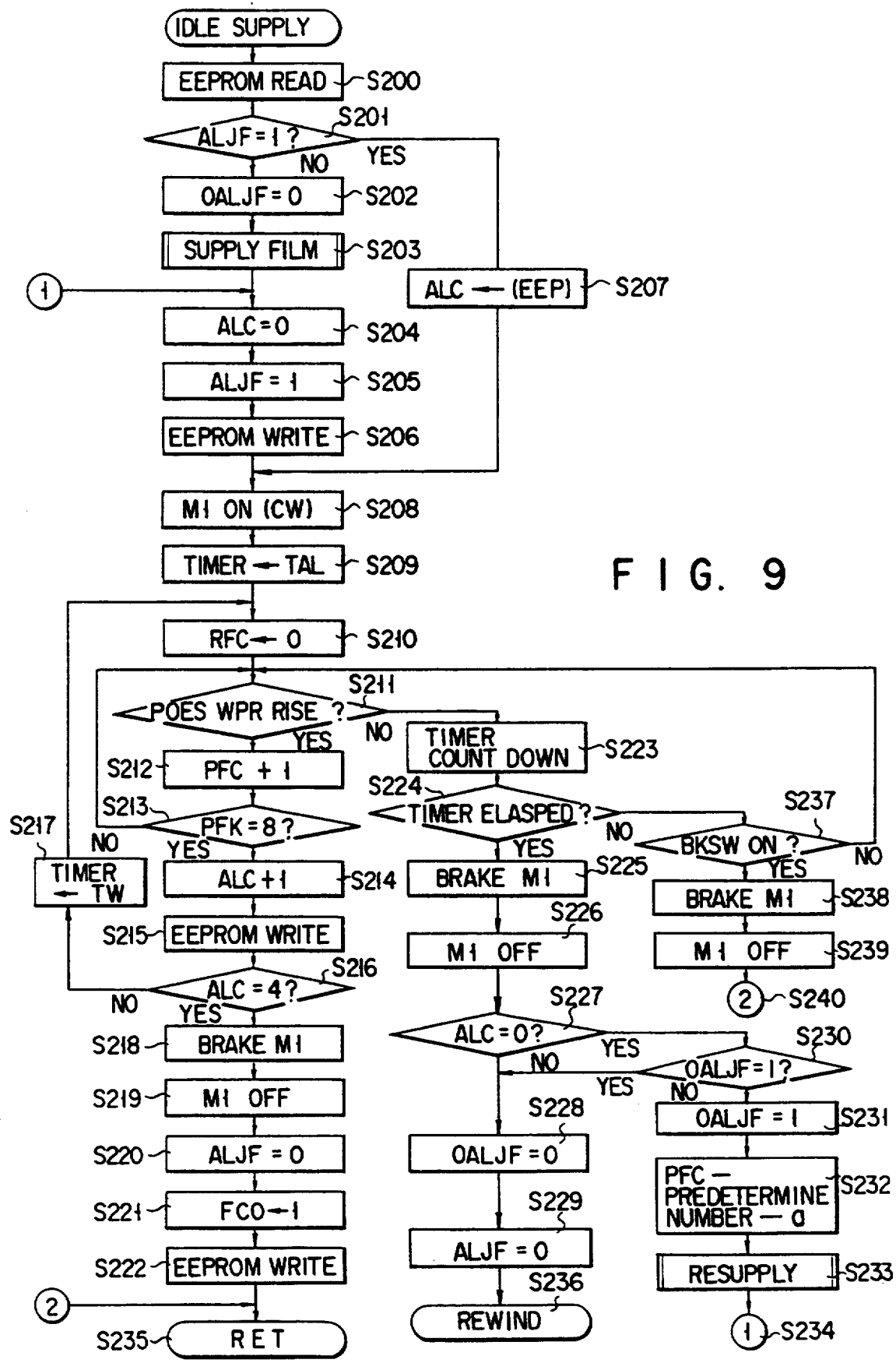
FIG. 9 is a flow chart of an idle supply subroutine according to the first embodiment of the present invention.

In the routine of FIG. 9, the film is supplied in step S203. However, in the third embodiment, as described above, since the film feeding operation is mechanically controlled by using the peripheral velocity difference between the spool 218 and the coupler gear 221, a routine corresponding to the routine of FIG. 9 is not used.

The CPU B100 checks whether a rise signal from the one-frame detection switch 1KSW B205 is detected (step S808). If NO in step S808, after the count-down operation of the timer is performed (step S814), the CPU B100 checks whether the time set in the timer has elapsed (step S815). When the timer operation is not stopped even with a lapse of a predetermined period of time, the CPU B100 displays an error mark "E" representing an erroneous idle feeding operation on the display unit B101, and the flow returns to the main routine through steps S817 to S820. On the other hand, the time set in the timer has not elapsed, the CPU B100 checks whether the rear cover switch BKSW B138 is ON. When the rear cover switch B138 is set in an OFF state, i.e., when the rear cover is kept closed, the flow returns to step S808, and the CPU B100 detects the state of the one-frame detection switch B205. The detection of the ON state of the one-frame detection switch 1KSW B205 corresponds to the number of perforations in the routine in FIG. 9.

When the rise signal of the one-frame detection switch 1KSW B205 is detected, the CPU B100 adds 1 to an idle supply counter ALAC (step S809), and the data is written in the EEPROM in the memory unit B103. In addition, a time TW2 shorter than the time TAL is set in an internal timer, and the CPU B100 checks whether the value of the idle supply counter ALC reaches 4. When the value does not reach 4, the flow returns to step S808 in the CPU B100. On the other hand, the number of idly supplied frames reaches 4, after the CPU B100 brakes the detection switch B204, the CPU B100 turns off the motor M3 B204. At this time, since the idle feeding state is completed, the idle feeding state flag ALJF is set to be "0", the information is written in the EEPROM in the memory unit B103, and the flow returns to the main routine (steps S817 to S821).

Figure 25:
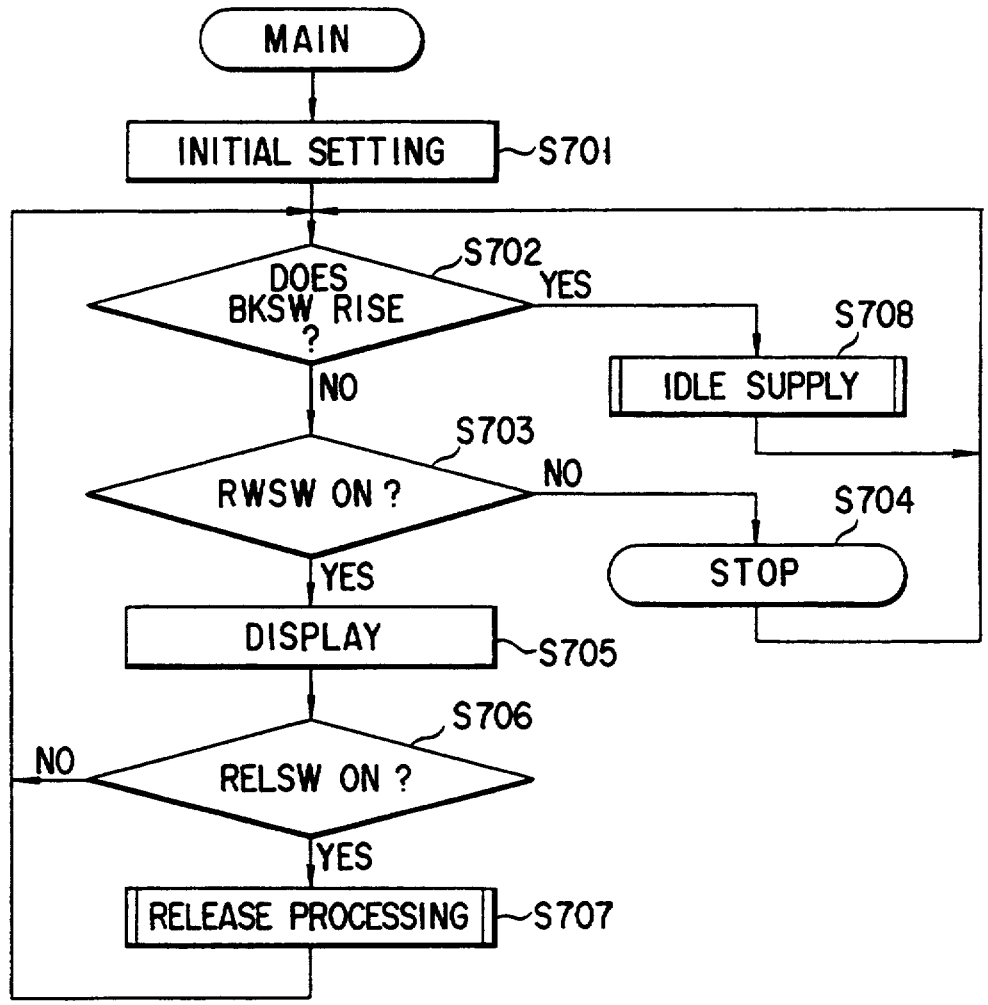
FIG. 25 is a flow chart of a main routine according to the third embodiment of the present invention.

When the rear cover switch BKSW B138 is turned on in step S822, i.e., when the rear cover is opened during an idle supply operation, the CPU B100 brakes the motor M3 B204 and turns off the motor M3 B204, and the flow returns to the main routine shown in FIG. 25 (steps S823 to S825).

Therefore, when the rear cover of the camera body is opened during the idle supply operation, the CPU B100 stops the idle supply operation in steps S822 to S825. When the rear cover is closed again, since, in the CPU B100, the flow advances to the idle feeding subroutine shown in FIGS. 26 and 27, the idle supply operation is performed again. At this time, since the idle supply state flag ALJF is not cleared to "0", the number of idly supplied frames is transmitted to the counter ALC in the CPU B100, thereby idly supplying only a lack of frames.

Figure 28:
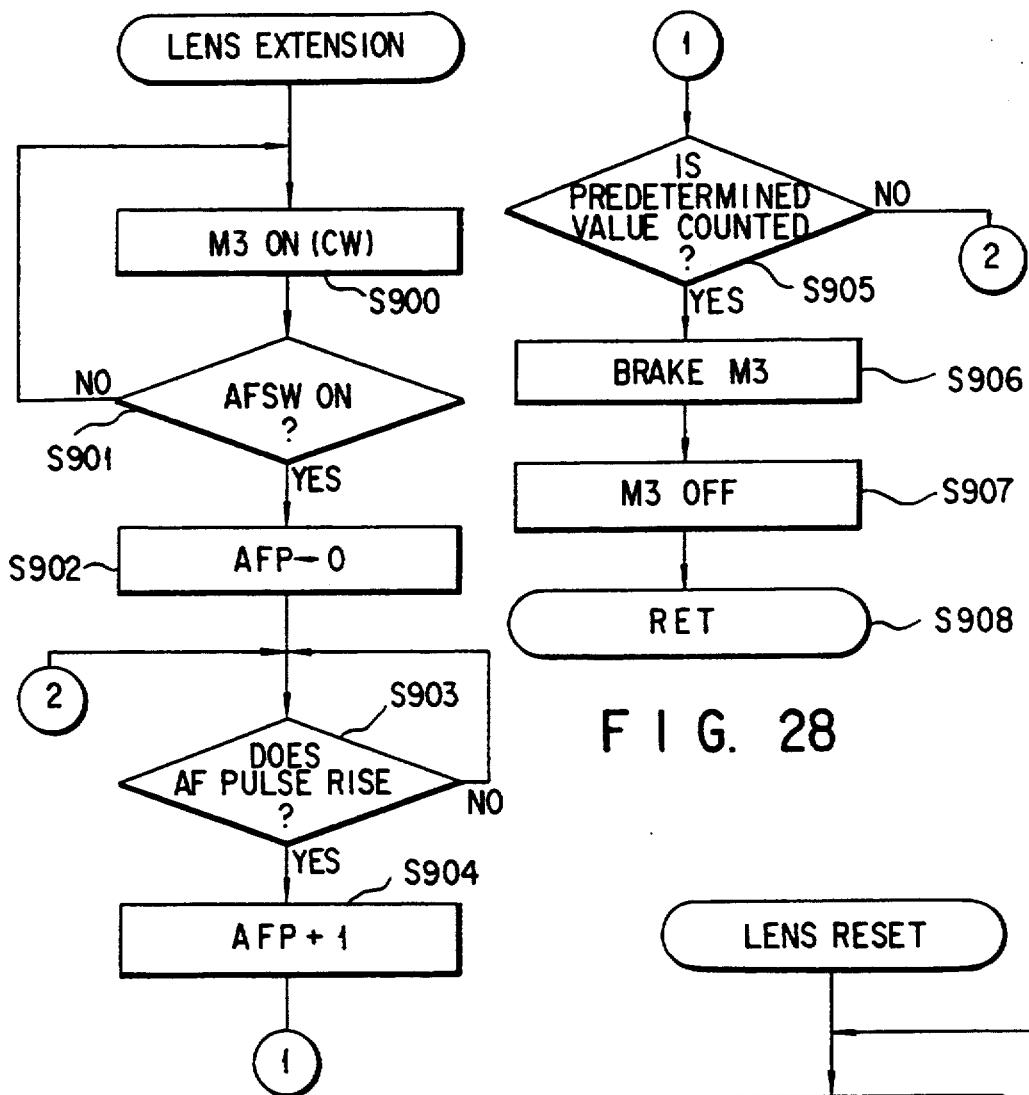
FIG. 28 is a flow chart of a lens extension subroutine according to the third embodiment of the present invention.

A lens extension operation will be described below with reference to FIG. 28. The routine shown in FIG. 28 is a part of release processing in the main routine. The motor M3 B224 is rotated clockwise to transmit its driving force to the driven gear 206 for a photographic operation, thereby driving an AF lens B123. When the AF lens B123 reaches a predetermined position, an auto-focusing lens switch AFSW is turned on. When this switch is turned on, the CPU B100 resets an internal counter AFP for counting the number of pulses generated during the extension operation of the AF lens B123 (step S902).

Every time the pulse is generated, the CPU B100 adds 1 to the counter AFP, and the CPU B100 checks whether the counter value of the counter AFP reaches a predetermined value (step S905). When the value does not reach the predetermined value, the flow returns to step S903 in the CPU B100. On the other hand, when the value reaches the predetermined value, the CPU B100 brakes the motor M3 B204 and turns off the motor M3 B204, and the flow returns to the main routine.

Figure 29:
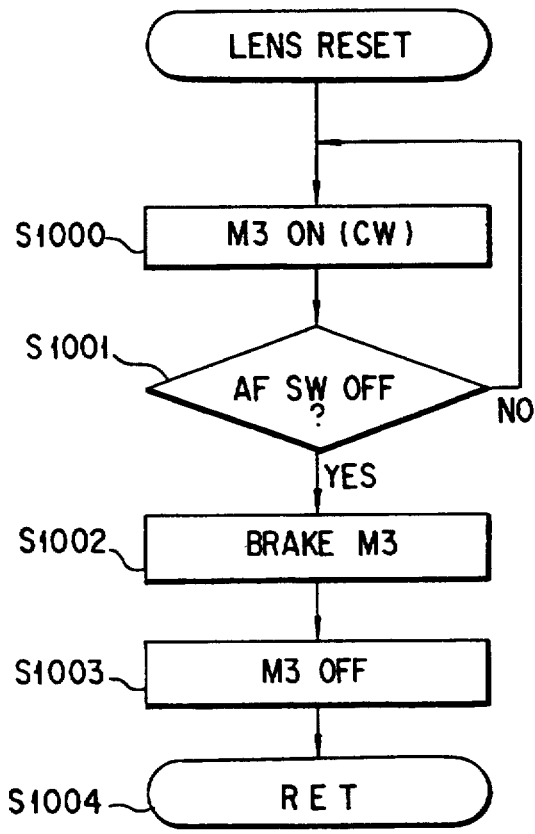
FIG. 29 is a flow chart showing a lens reset subroutine according to the third embodiment of the present invention.

A lens reset subroutine will be described below with reference to FIG. 29. The CPU B100 rotates the motor M3 B204 clockwise (step S1000), and checks the initial position of the AF lens B123 as the state of the switch AFSW. When the switch AFSW is set in an ON state, the flow returns to step S1000. On the other hand, when the switch AFSW is set in an OFF state, the CPU B100 brakes the motor M3 B204 in step S1002, the CPU B100 turns off the motor M3 B204 in step S1003, and the flow returns to the main routine.

A normal film winding operation after an idle supply operation will be described with reference to the routine in FIG. 30. In step S1100, the CPU B100 drives the motor M3 B204 counterclockwise. Subsequently, the CPU B100 detects a rise signal from the one-frame detection switch 1KSW B205. When the rise signal is detected, the CPU B100 determines that a one-frame winding operation is completed, and the flow advances to step S1103. In addition, after the CPU B100 adds 1 to a frame counter FCO, the flow returns to the main routine through steps S1116 to S1121. On the other hand, when the rise signal from the switch 1KSW B205 is not detected, the flow advances to step S1102 in the CPU B100, and the CPU B100 detects the state of the rewinding switch RSW B207. When the rewinding switch RSW is set in an OFF state, the flow returns to step S1101. When the rewinding switch RSW is set in an ON state, the CPU B100 determines that a rewinding state is set, and the flow advances to step S1105.

A time TR required to detect completion of the rewinding operation is set in the internal timer by the CPU B100 in step S1105, and the CPU B100 checks (step S1106) whether a rise signal from the one-frame detection switch 1KSW B205 is detected. When the rise signal is not detected, the CPU B100 performs the count-down operation of the internal timer, and the CPU B100 checks in step S1108 whether the time TR set in the timer has elapsed. The time TR set in the timer has not elapsed, the flow returns to S1106. When the time TR set in the timer has elapsed, the CPU B100 determines that a film rewinding operation is set, and the CPU B100 stops the motor M3 B204 in steps S1110 and S1111. Thereafter, the CPU B100 drives the motor M3 B204 clockwise to reset the driving system. When the switch AFSW is turned off, the CPU B100 stops the motor M3 B204 in steps S1110 and S1111, and the flow returns to the main routine.

As has been described above, according to the present invention, there is provided an automatic film feeding apparatus for a camera in which a film can be automatically and reliably loaded, and when a user erroneously opens a rear cover while a nonexposed film is fed from a film cartridge, undesirable exposure of the film can be minimized by only closing the rear cover.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. A camera using a film cartridge in which a supply spool incorporated in a film cartridge body is rotated to supply a film wound on said supply spool out of the film cartridge body, the camera comprising:

a cartridge storage chamber into which the film cartridge is loaded;

opening/closing operation-detecting means for detecting whether a film cartridge cover is opened or closed;

supply means for supplying the film to the outside of the film cartridge, said supply means including: (a) an engagement member engageable with the supply spool in a state where the film cartridge is loaded in the cartridge storage chamber, and (b) feeding driver mechanism for rotating the engagement member in a direction in which the film is supplied;

a film storage chamber located opposite to the cartridge storage chamber, with an exposure section being situated between the film storage chamber and the cartridge storage chamber;

winding means for winding the film supplied from the film cartridge, said winding means including: (a) a film winding spool located in the film storage chamber, and (b) a winding driver mechanism for rotating the film winding spool in a direction in which the film is wound;

film supply amount-detecting means for detecting a film supply amount;

first control means for controlling the supply means to start a film supplying operation in response to a closing operation of the film cartridge cover and to stop the film supplying operation when the film supply amount reaches a first predetermined value;

second control means for controlling the winding means to start a film winding operation in response to termination of the film supplying operation and to stop the film winding operation when the film supply amount reaches a second predetermined value, said second control means including:

means for determining a film winding-disabled state and for stopping the film winding operation, if the film supply amount does not reach the second predetermined value a predetermined period of time after the start of the film winding operation; and third control means for eliminating the film winding disabled state by causing the supply means to continue the film supplying operation until the film supply amount is advanced to reaches a third predetermined value which is smaller than the first predetermined value, and for subsequently causing the winding means to perform the film winding operation.

2. A camera using a film cartridge in which a supply spool incorporated in a film cartridge body is rotated to supply a film wound on said supply spool out of the film cartridge body, the camera comprising:

a cartridge storage chamber into which the film cartridge is loaded;

opening/closing operation-detecting means for detecting whether a film cartridge cover is opened or closed;

supply means for supplying the film to the outside of the film cartridge, said supply means including: (a) an engagement member engageable with the supply spool in a state where the film cartridge is loaded in the cartridge storage chamber, and (b) a feeding driver mechanism for rotating the engagement member in a direction in which the film is supplied;

a film storage chamber located opposite to the cartridge storage chamber, with an exposure section being situated between the film storage chamber and the cartridge storage chamber;

winding means for winding the film supplied from the film cartridge, said winding means including: (a) a film winding spool located in the film storage chamber, and (b) a winding driver mechanism for rotating the film winding spool in a direction in which the film is wound;

film supply amount-detecting means for detecting a film supply amount;

first control means for controlling the supply means to start a film supplying operation in response to a closing operation of the film cartridge cover and to stop the film supplying operation when the film supply amount reaches a first predetermined value, said first control means including:

means for interrupting the film supplying operation if the film cartridge cover is opened during execution of the film supplying operation;

means for calculating a difference between the first predetermined value and a film supply amount by which the film has been supplied when the film supplying operation is interrupted; and means for resupplying the film by an amount corresponding to the difference calculated by the calculating means, when the film cartridge cover is closed in a state where the film supplying operation is interrupted; and second control means for controlling the winding means to start a film winding operation when the film supplying operation is terminated and to stop the film winding operation when the film supply amount has reached a second predetermined value.

second control means for controlling the winding means to start a film winding operation when the film supplying operation is terminated and to stop the film winding operation when the film supply amount has reached a second predetermined value.

* * * * *